United States Patent
Li et al.

(10) Patent No.: US 7,936,810 B2
(45) Date of Patent: May 3, 2011

(54) DELAYED COMBINING OF FREQUENCY-DOMAIN EQUALIZED WIRELESS CHANNELS WITH LARGE DELAY-SPREADS

(75) Inventors: Yuan Li, San Diego, CA (US); Toshio Nagata, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 751 days.

(21) Appl. No.: 11/518,559

(22) Filed: Sep. 8, 2006

(65) Prior Publication Data
US 2007/0071071 A1    Mar. 29, 2007

Related U.S. Application Data

(60) Provisional application No. 60/715,287, filed on Sep. 8, 2005, provisional application No. 60/715,286, filed on Sep. 8, 2005, provisional application No. 60/715,285, filed on Sep. 8, 2005, provisional application No. 60/715,359, filed on Sep. 8, 2005.

(51) Int. Cl.
*H03H 7/30* (2006.01)

(52) U.S. Cl. ........ 375/229; 375/130; 375/147; 375/260; 375/316; 370/335; 370/441

(58) Field of Classification Search .......... 375/229, 375/232, 316, 130, 147, 260; 370/335, 441
See application file for complete search history.

(56) References Cited

U.S. PATENT DOCUMENTS

| | | | |
|---|---|---|---|
| 6,011,812 A * | 1/2000 | Laakso et al. | 375/152 |
| 6,594,320 B1 * | 7/2003 | Sayeed | 375/281 |
| 6,674,790 B1 | 1/2004 | Rasmussen et al. | 375/146 |
| 2002/0159505 A1 * | 10/2002 | Hayashibara | 375/147 |
| 2004/0242156 A1 * | 12/2004 | Tiirola et al. | 455/25 |
| 2005/0026578 A1 | 2/2005 | Kelley | 455/132 |
| 2005/0083998 A1 | 4/2005 | Li et al. | 375/148 |
| 2006/0029144 A1 | 2/2006 | Dabak et al. | |
| 2006/0034352 A1 | 2/2006 | Sampath et al. | |
| 2008/0219341 A1 * | 9/2008 | Kim | 375/232 |

OTHER PUBLICATIONS

Ihan Martoyo, Timo Weiss, Faith Capar, Friedrich K. Jondral, "Low Complexity CDMA Downlink Receiver Based on Frequency Doman Equalization" Vehicular Technology Conference (VTC), vol. 2, pp. 987-991, Oct. 2003, (5 pages).

(Continued)

*Primary Examiner* — Chieh M Fan
*Assistant Examiner* — Leila Malek
(74) *Attorney, Agent, or Firm* — Lawrence J. Bassuk; W. James Brady; Frederick J. Telecky, Jr.

(57) ABSTRACT

Methods and apparatus to perform frequency-domain equalization in high-speed downlink packet access (HSDPA) receivers for wireless channels with large delay-spreads are disclosed. An example method comprises computing a first frequency-domain equalizer (FDE) coefficient for a first set of multipaths, computing a second FDE coefficient for a second set of multipaths, computing a first equalized signal by equalizing a received code division multiple access (CDMA) signal with the first FDE coefficient, computing a second equalized signal by equalizing the received CDMA signal with the second FDE coefficient, delaying the first equalized signal by a delay difference between the first and the second sets, and combining the delayed first equalized signal and the second equalized signal.

3 Claims, 16 Drawing Sheets

OTHER PUBLICATIONS

Larry J. Greenstein, Vinko Erceg, Yu Shuan Yeh, and Martin V. Clark, "A New Path-Gain/Delay-Spread Propagation Model for Digital Cellular Channels", IEEE Transactions on Vehicular Technology, vol. 46, No. 2, May 1997, pp. 477-485, (9 pages).

Kari Hooli, Matti-Latva-aho, Markku Juntti, "Performance Evaluation of Adaptive Chip-Level Channel Equalizers in WCDMA Downlink", IEEE Int'l Conference on Communications (ICC), pp. 1974-1979, Jun. 2001, (6 pages).

* cited by examiner

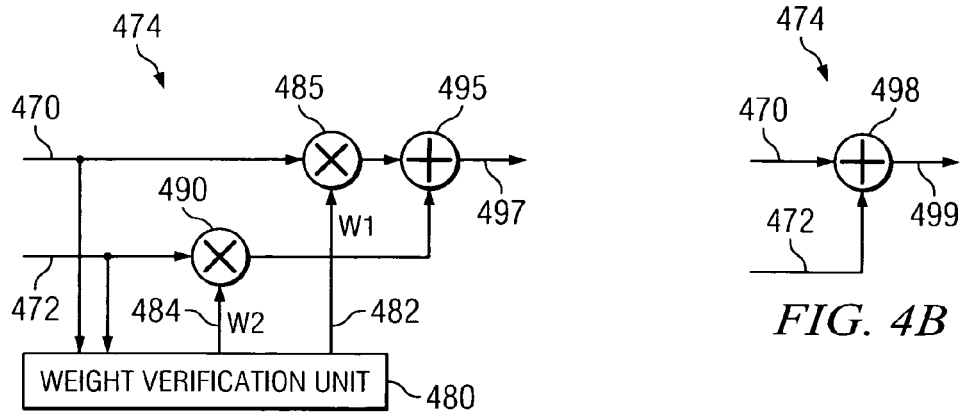
FIG. 4A
FIG. 4B
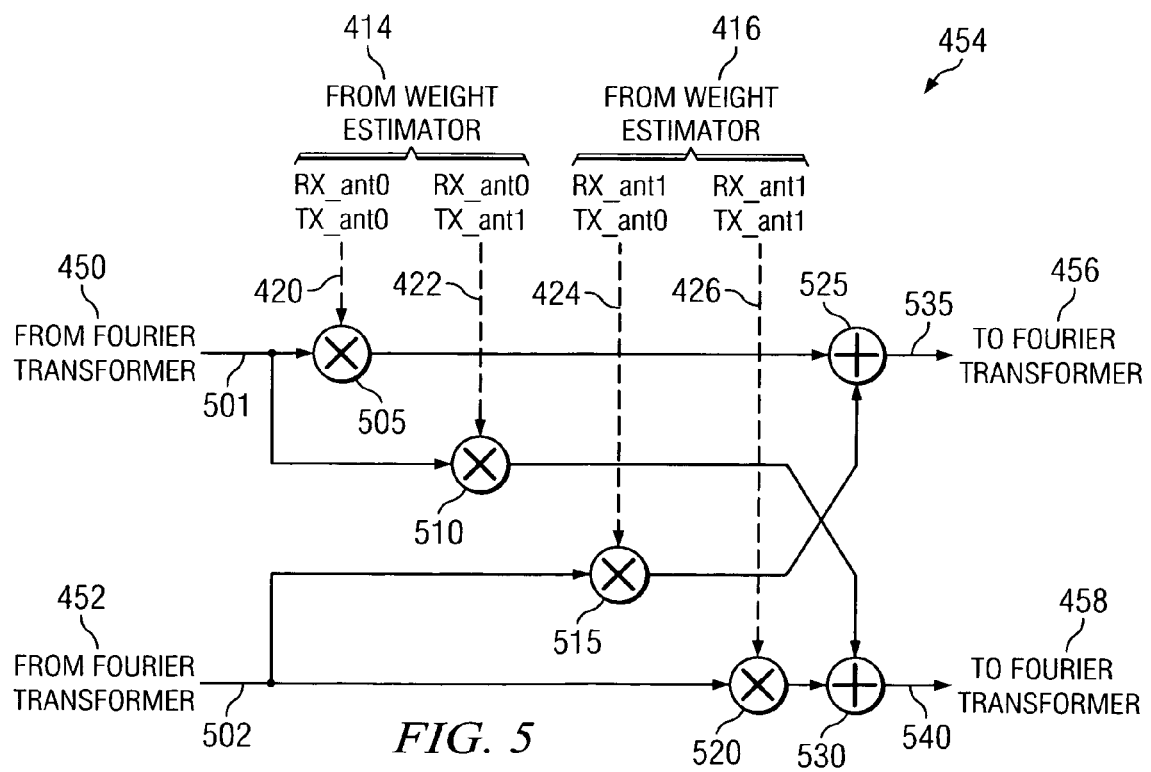
FIG. 5

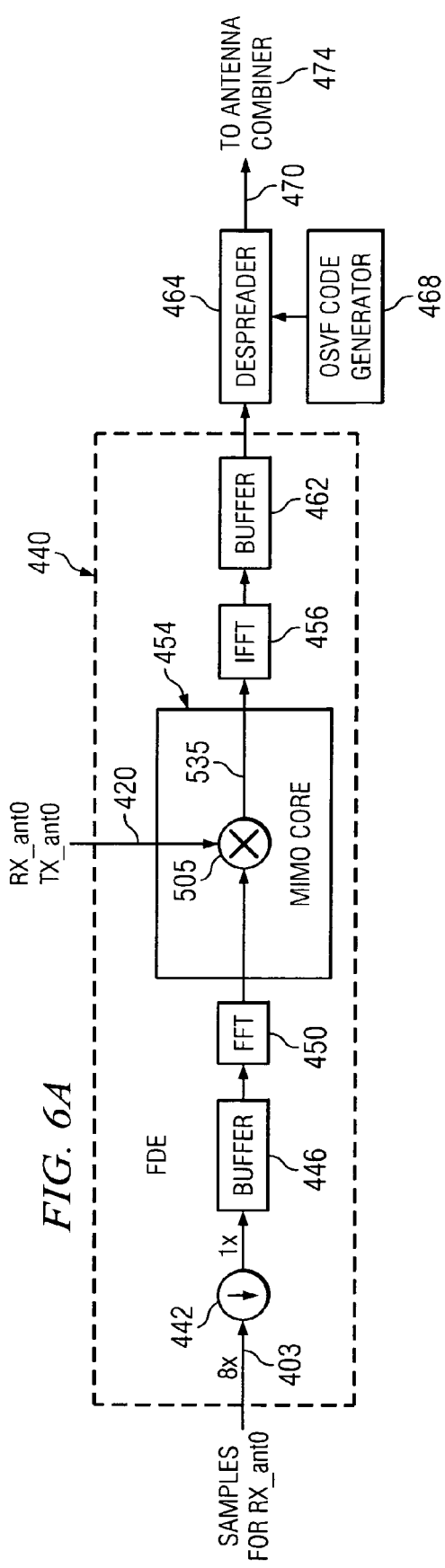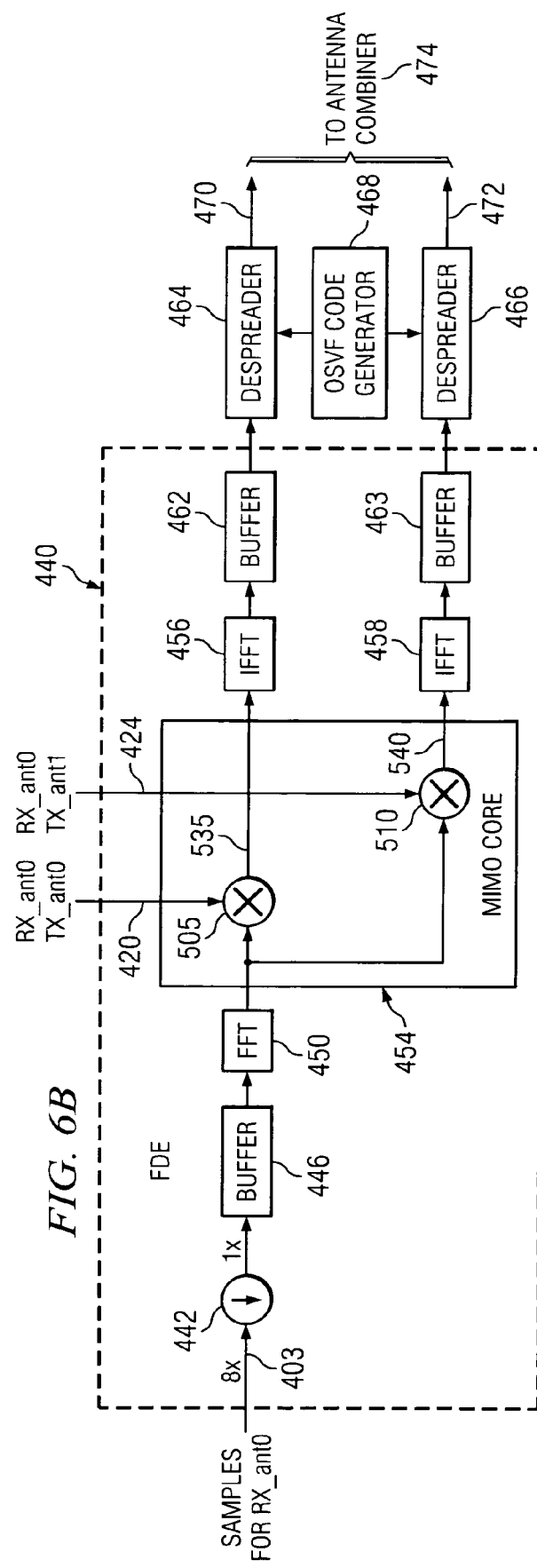
FIG. 6A
FIG. 6B

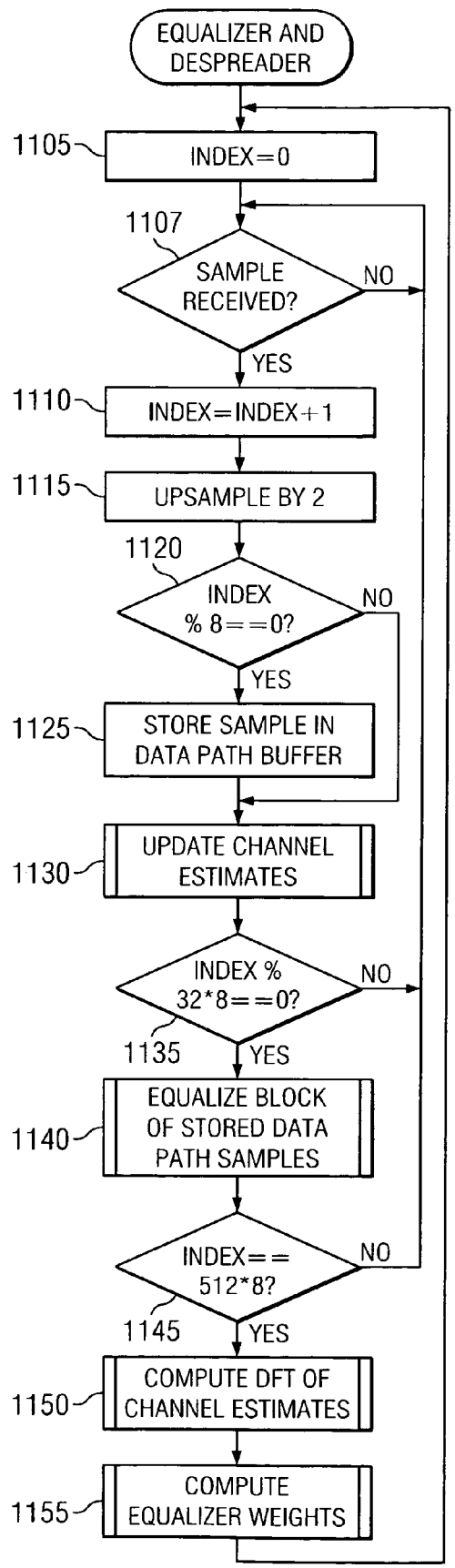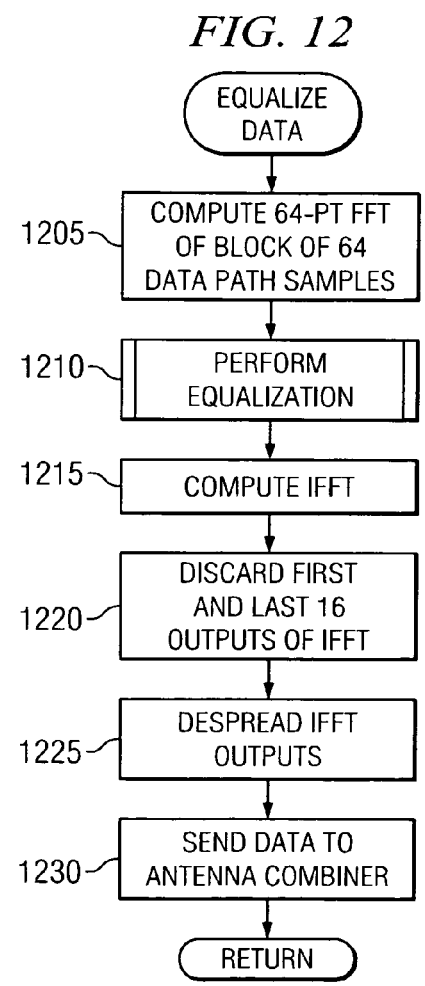

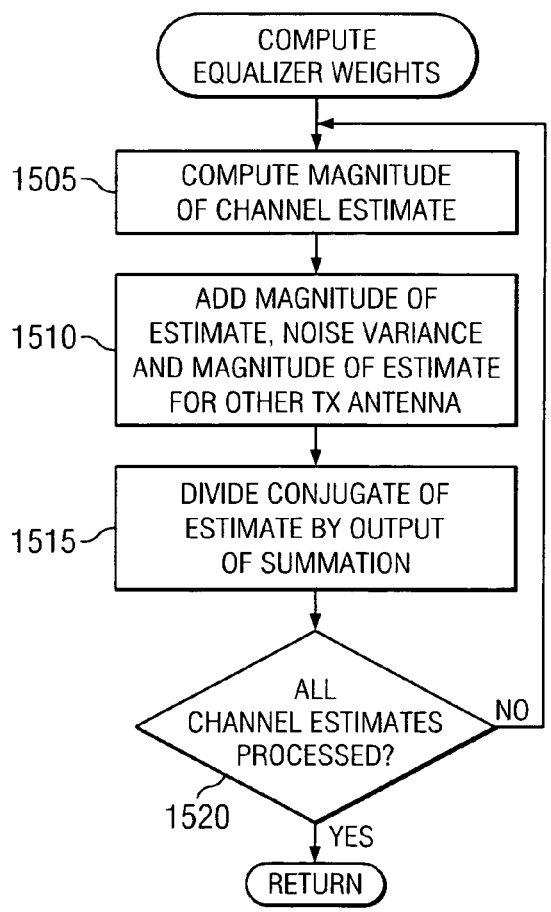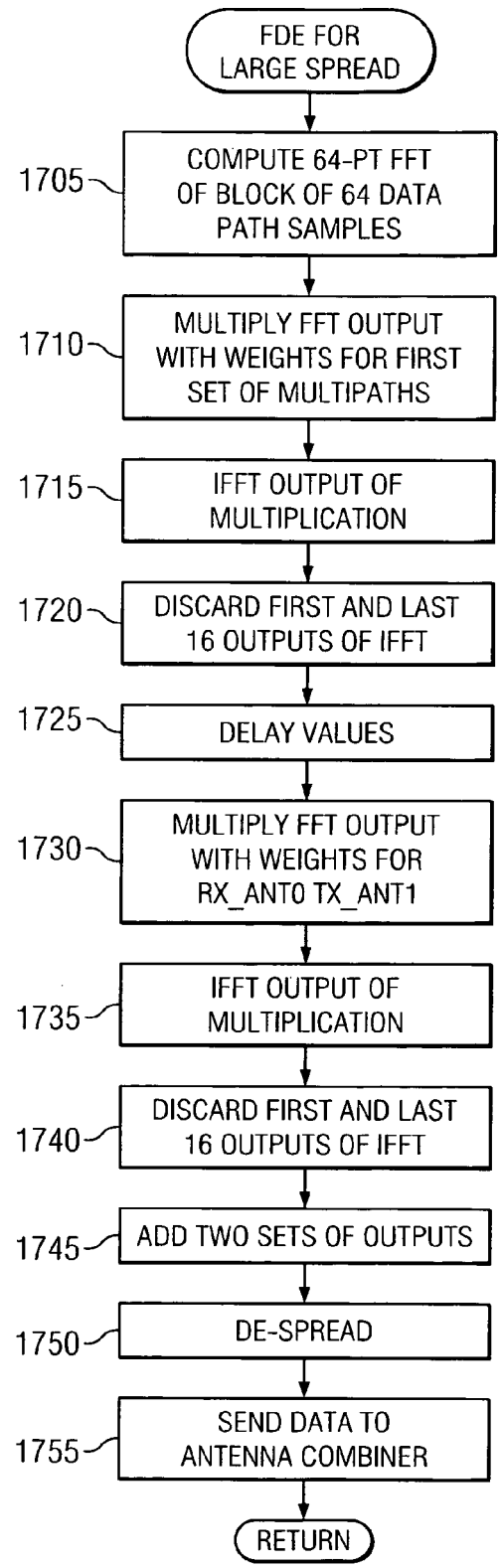

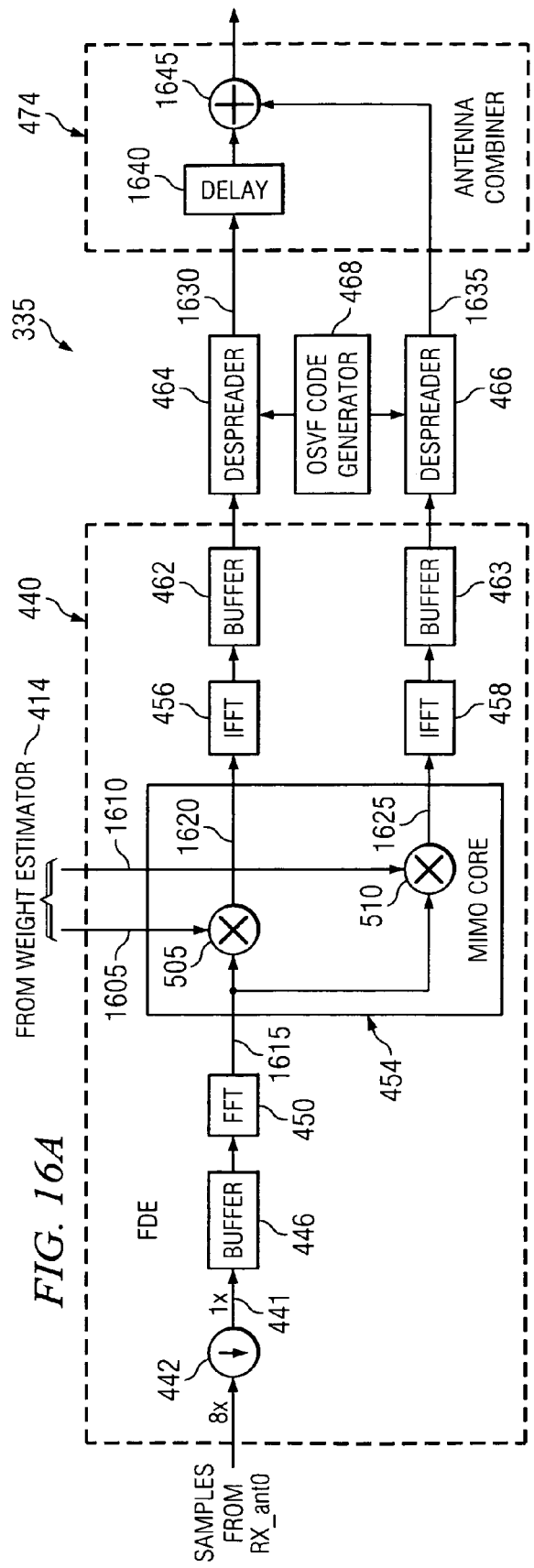
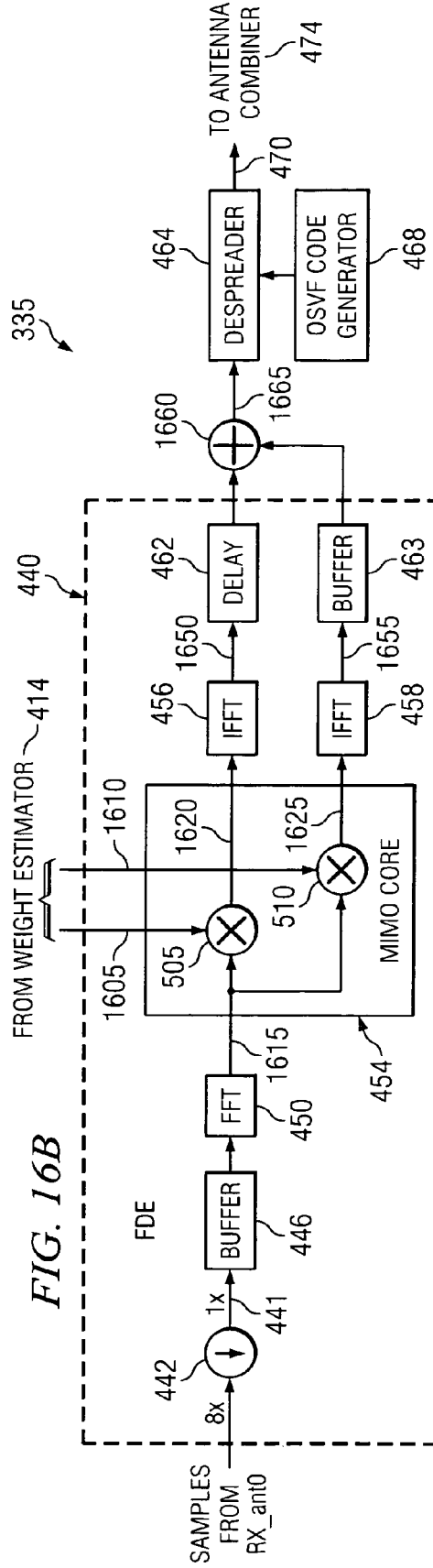
FIG. 16A
FIG. 16B

DELAYED COMBINING OF FREQUENCY-DOMAIN EQUALIZED WIRELESS CHANNELS WITH LARGE DELAY-SPREADS

RELATED APPLICATIONS

This patent claims priority from U.S. Provisional Application Ser. No. 60/715,287 entitled "Frequency-domain interpolation of fractional spaced channel estimation for frequency-domain equalization" which was filed on Sep. 8, 2005; U.S. Provisional Application Ser. No. 60/715,286 entitled "Algorithm for closed loop transmit diversity with frequency-domain equalization" which was filed on Sep. 8, 2005; U.S. Provisional Application Ser. No. 60/715,285 entitled "Noise Estimation algorithm for frequency-domain equalizer" which was filed on Sep. 8, 2005; and U.S. Provisional Application Ser. No. 60/715,359 entitled "Frequency-domain equalizer for channels with large delay-spread" which was filed on Sep. 8, 2005. Each of U.S. Provisional Patent Application Ser. Nos. 60/715,287, 60/715,286, 60/715,285 and 60/715,359 is hereby incorporated by reference in its entirety.

FIELD OF THE DISCLOSURE

This disclosure relates generally to receivers for wireless communication systems, and, more particularly, to methods and apparatus to perform frequency-domain equalization in high-speed downlink packet access (HSDPA) receivers for wireless channels with large delay-spreads.

BACKGROUND

Third generation (3G) mobile radio standards (e.g., Code Division Multiple Access (CDMA) 2000, Universal Mobile Telecommunications Systems (UMTS)) for wireless communication systems have been undergoing development since the mid-1990s. 3G standards initially supported data rates up to 2 megabits per second (Mbps), but have since evolved to support data rates up to 14 Mbps. Asymmetric 3G wireless user services (e.g., web browsing) requiring high downlink capacity (e.g., from a wireless base station to a wireless mobile device) led to the development of the High Speed Downlink Packet Access (HSDPA) standard and the Evolution Data and Voice (EV-DV)/Evolution Data Optimized (EV-DO) standard.

In 3G standards, CDMA transmissions on a downlink path are typically designed to be orthogonal at a transmitter. However, multipaths can destroy the orthogonality thereby resulting in significant inter-code/inter-path interference at a wireless receiver. In the context of 3G, orthogonality refers to the use of spreading sequences that are orthogonal to each other, that is, there is no correlation between a first spreading sequence and a second spreading sequence. The lower the CDMA spreading factor being utilized, and the closer a user is located to a wireless base station, the more deleterious the effects of interference due to multipaths become. Unfortunately, high data-rate wireless systems such as EV-DV/EV-DO and HSDPA for UMTS employ a low spreading factor and may utilize a scheduling rule that tends to select users that are close to the wireless base station and, thus, compound multipath interference effects.

BRIEF DESCRIPTION OF THE DRAWINGS

FIGS. 4A and 4B illustrate example manners of implementing the example antenna combiner of FIG. 4.

FIG. 5 illustrates an example manner of implementing the example MIMO core of FIG. 4.

FIGS. 6A, 6B and 6C illustrate example configurations of the example equalizer and despreader of FIGS. 3 and/or 4.

FIGS. 11 and 12 are flowcharts representative of example machine readable instructions which may be executed to implement the example equalizer and despreader of FIGS. 3 and/or 4.

FIGS. 13, 14 and 15 are flowcharts representative of example machine readable instructions which may be executed to implement the example weight estimator of FIG. 7.

FIGS. 16A and 16B illustrate example configurations of the example equalizer and despreader of FIGS. 3 and/or 4 to support large delay-spread wireless channels.

FIG. 17 is a flowchart representative of example machine readable instructions which may be executed to implement the example equalizer and despreader of FIGS. 3 and/or 4 to support large delay-spread wireless channels.

DETAILED DESCRIPTION

To facilitate review and understanding, this patent has been organized in accordance with the following headings:
  I. Example Wireless Systems and Mobile Devices (paragraphs [0029]-[0085])
  II. Fractional-Spaced Channel Estimation (paragraphs [0086]-[00135])
  III. Frequency-Domain Equalization for Large Delay-spread Channels (paragraphs [00136]-[00153])
  IV. Frequency-Domain Equalization for Closed-Loop Transmit Diversity (paragraphs [00154]-[00174])
  V. Noise Estimation (paragraphs [00175]-[00221])
  VI. Example Processor Platform (paragraphs [00222]-[00225])

I. Example Wireless Systems and Mobile Devices

Figure 1:
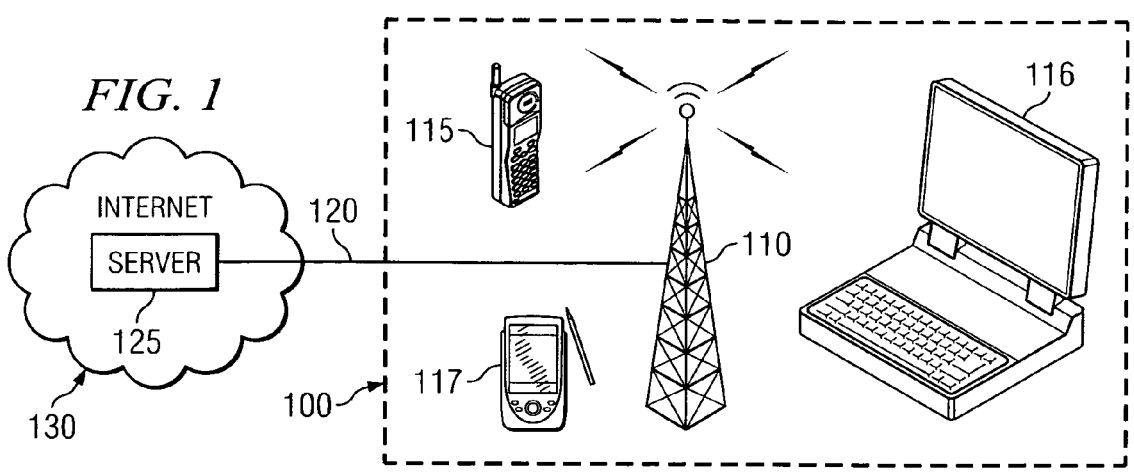
FIG. 1 is a schematic diagram of an example wireless communication system that includes a wireless base station and a plurality of wireless mobile devices.

FIG. 1 is a schematic diagram of an example wireless communication system 100. To provide wireless data and/or communication services (e.g., telephone services, Internet services, data services, messaging services, instant messaging services, electronic mail (email) services, chat services, video services, audio services, gaming services, etc.), the example system 100 of FIG. 1 includes a wireless base station 110 and any of a variety of wireless devices, three of which are illustrated in FIG. 1 with reference numerals 115, 116 and 117. Example wireless devices include a wireless handset 115 (e.g., a cellular phone or a smart phone), a laptop computer 116, a personal digital assistant (PDA) 117, etc. While the example wireless devices 115-117 illustrated in FIG. 1 are mobile wireless devices, wireless devices 115-117 may also be substantially fixed-location wireless devices such as a kiosk or a desktop computer with wireless communication capabilities. An example manner of implementing any of the example wireless devices 115-117 is discussed below in connection with FIG. 2.

The example wireless base station 110 and/or the example wireless devices 115-117 of FIG. 1 are implemented in accordance with one or more past, present and/or future wireless communication standards and/or specifications (e.g., HSDPA (a.k.a. 3½ G), 3G, CDMA2000, UMTS, EV-DV, EV-DO, CDMA, wideband-CDMA (W-CDMA)) and/or implement features from one or more such standards and/or specifications. Moreover, the example base station 110 and/or the example wireless devices 115-117 may implement a similar and/or a different set, subset and/or combination of such standards and/or specifications.

In the example of FIG. 1, to allow the plurality of example wireless devices 115-117 to communicate with devices and/or servers located outside the example wireless system 100, the example wireless base station 110 is communicatively coupled via any of a variety of communication paths 120 to, for example, any of a variety of servers 125 associated with public and/or private network(s) such as the Internet 130. The example server 125 may be used to provide, receive and/or deliver, for example, any variety of data, video, audio, telephone, gaming, Internet, messaging, electronic mail, etc. service. While not illustrated in FIG. 1, the example wireless system 100 may be, additionally or alternatively, communicatively coupled to any of a variety of public, private and/or enterprise communication network(s), computer(s), workstation(s) and/or server(s) to provide any of a variety of voice service(s), data service(s) and/or communication service(s) such as the public switched telephone network (PSTN).

While a single base station 110 is illustrated in the example of FIG. 1, persons of ordinary skill in the art will readily appreciate that the example wireless system 100 could include any of a variety and/or number of base stations 110. For example, to provide wireless data and/or communication services over a geographic area and/or geographic region, a plurality of communicatively coupled base stations 110 could be utilized. For example, a plurality of base stations 110 could be arranged in a pattern and/or grid with abutting and/or overlapping coverage areas such that a wireless device 115-117 located in, and/or moving through and/or within an area communicatively covered by one or more of the plurality of wireless base stations 110 can communicate with at least one of the base stations 110.

While, for purposes of illustration, this disclosure refers to the wireless devices 115-117 of FIG. 1, the example wireless system 100 of FIG. 1 may be used to provide services to, from and/or between any alternative and/or additional wired and/or wireless communication devices. Additionally, although for purposes of explanation, this disclosure refers to the example wireless system 100, the example base station 110 and/or the example wireless devices 115-117 illustrated in FIG. 1, any additional and/or alternative variety and/or number of communication systems, communication devices and/or communication paths may be used to implement wireless systems and/or provide voice, Internet, data and/or communication services. Moreover, while this disclosure references CDMA and/or HSDPA devices and/or communication technologies, persons of ordinary skill in the art will appreciate that the base stations 110 and/or the devices 115-117 may operate in accordance with any of a variety of additional and/or alternative standard(s) and/or specification(s).

Similarly, while for purposes of illustration, this disclosure references performing channel estimation, equalizing received signals and/or performing noise estimation for the example wireless system 100 of FIG. 1, persons of ordinary skill in the art will readily appreciate that the methods and apparatus disclosed herein may, additionally or alternatively, be applied to any of a variety wireless communication systems and/or networks.

While a single CDMA signal may be transmitted to a particular wireless device 115-117, the wireless device 115-117 may actually receive the transmitted signal via one or more multipaths. As used herein the term "multipaths" refers collectively to two or more transmission paths by which a signal transmitted by one device (e.g., the wireless base station 110) is received by a second device (e.g., a wireless device 115-117). In such circumstances, a receiver receives the transmitted signal a number of times any or all of the received versions of the transmitted signal may have a different time delay, signal attenuation, and/or phase relative to the other received versions. Multipaths are created by reflections of the transmitted wireless signal off of objects located near the transmitter or the receiver, and/or in between the transmitter and the receiver. For example, any or all of buildings, bridges, cars, clouds, etc. can cause such reflections. Further, the term "multipath" as used herein refers to one of the plurality of transmission paths between the first device and the second device (i.e., one of the paths comprising the multipaths).

Figure 2:
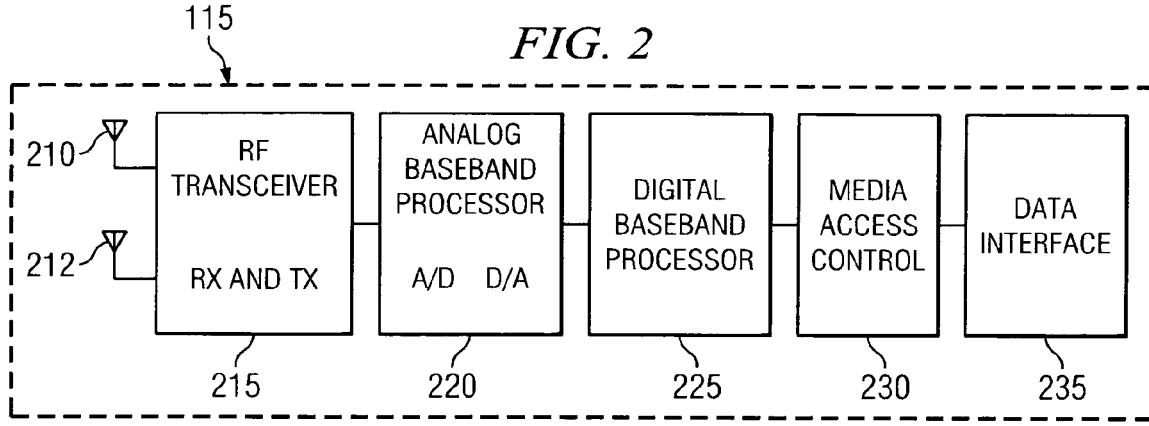
FIG. 2 illustrates an example manner of implementing any of the example wireless mobile devices of FIG. 1.

FIG. 2 illustrates an example manner of implementing any of the example wireless devices 115-117 of FIG. 1. However, for ease of discussion, the example device of FIG. 2 will be referred to as device 115. To transmit and receive wireless radio frequency (RF) signals (e.g., modulated CDMA signals) to and/or from the wireless base station 110 (FIG. 1), the example device 115 of FIG. 2 includes any of a variety of antennas, two of which are illustrated in FIG. 2 with reference numerals 210 and 212. As discussed below, the example device 115 can use and/or combine signals received from the antennas 210 and 212 using any of a variety of technique(s), method(s) and/or algorithm(s) to implement any of a variety of receive diversity configurations. As used herein, the term "RX_ant0" will be used to refer to antenna 210 and the term "RX_ant1" will be used to refer to antenna 212. While the example device 115 of FIG. 2 includes two antennas 210, 212 of the same type, a wireless device 115 may include any number (e.g., one (1), three (3), etc.) and/or variety of receive antennas.

To process the RF signals received from the wireless base station 110 via the antenna(s) 210, 212, and to generate RF signals for transmission to the wireless base station 110 via the antenna(s) 210, 212, the example wireless device 115 contains any of a variety of RF transceivers 215. Using any of a variety of frequency(-ies), circuit(s), component(s), module(s), method(s) and/or technique(s), the example RF transceiver 215 of FIG. 2 modulates baseband transmit signals received from an analog baseband processor 220 to RF-band signals, and demodulates RF-band signals received via the antenna(s) 210, 212 to baseband signals.

To handle conversions between the analog domain and the digital domain, the example wireless device 115 of FIG. 2 includes any of a variety of analog baseband processors 220. The example analog baseband processor 220 of FIG. 2 includes any of a variety of analog-to-digital (A/D) converters (not shown) to transform analog baseband signals received from the RF transceiver 215 into digital baseband signals for processing by the digital baseband processor 225. The example analog baseband processor 220 also includes any of a variety of digital-to-analog (D/A) converters (not shown) to transform digital baseband signals received from the digital baseband processor 225 into analog baseband signals for transmission via the RF transceiver 215 and the antenna(s) 210, 212. The example analog baseband processor 220 may also include any of a variety of additional block(s), component(s) and/or circuit(s) such as, filters, amplifiers, etc.

To implement digital receive functions (e.g., equalization, despreading, antenna combining, etc.) and digital transmit functions (e.g., modulation, spreading, etc.), the example wireless device 115 of FIG. 2 includes the digital baseband processor 225. An example manner of implementing the digital baseband processor 225 is discussed below in connection with FIG. 3.

To provide medium access functionality, the example wireless device 115 of FIG. 2 includes any of a variety medium access controllers 230. Using any of a variety of technique(s), protocol(s), method(s) and/or algorithm(s), the example medium access controller 230 controls access to the physical transmission media and/or wireless channels by, for example, controlling use of and/or access to logical and/or physical channels, recognizing where frames begin and/or end in a received bit-stream, delimiting data frames, creating data frames, transmission error detection and/or correction, data frame filtering, etc.

To provide an interface to other parts of the example wireless device 115 and/or a device communicatively coupled to the wireless device 115, the example wireless device 115 of FIG. 2 includes any of a variety of data interfaces 235. In some examples, the data interface 235 implements a network interface in accordance with any of a variety of past, current and/or future Ethernet standards such as the Institute of Electrical and Electronics Engineers (IEEE) 802.11x or 802.16x families of standards. Alternatively or additionally, the data interface 235 provides data to any of a variety of processor that, for example, outputs received information (e.g., video, sound, voice, etc.) for use by a user.

While an example manner of implementing the example wireless device 115 is illustrated in FIG. 2, the wireless device 115 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 2 may be combined, divided, re-arranged, eliminated and/or implemented in any of a variety of ways. Additionally, the example RF transceiver 215, the example analog baseband processor 220, the example digital baseband processor 225, the example medium access controller 230, the example data interface 235 and/or the example wireless device 115 may be implemented as any combination of firmware, software, logic and/or hardware. Moreover, the example wireless device 115 may include additional processor(s), device(s), component(s), circuit(s), interface(s) and/or module(s) than those illustrated in FIG. 2 and/or may include more than one of any or all of the illustrated processor(s), device(s), component(s), circuit(s), interface(s) and/or module(s).

Figure 3:
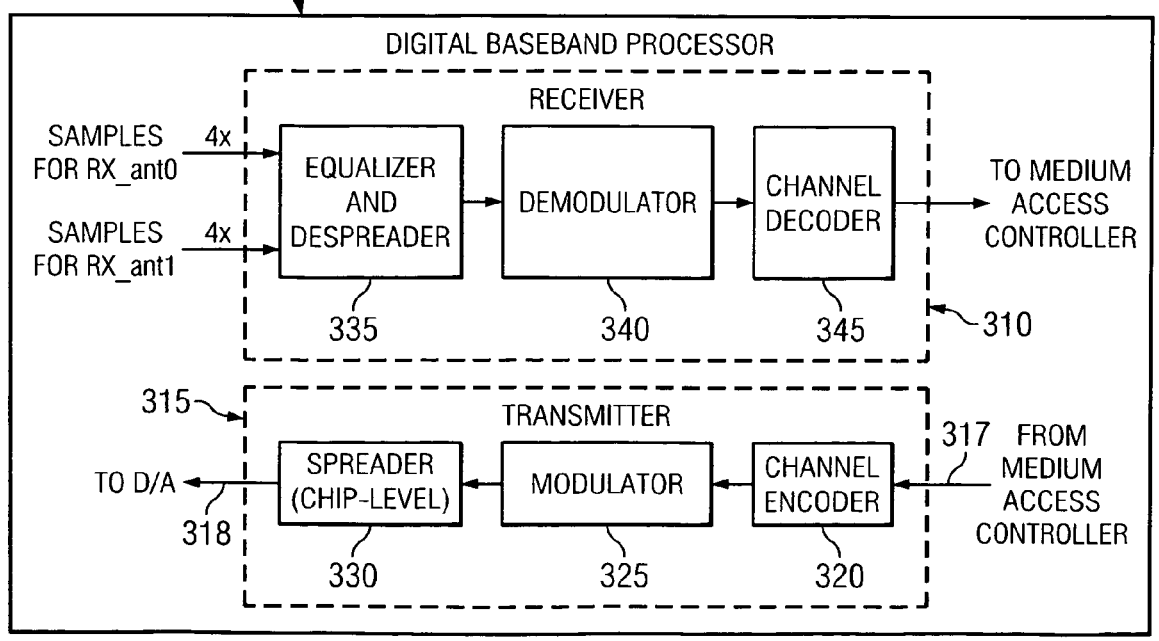
FIG. 3 illustrates an example manner of implementing the example digital baseband processor of FIG. 2.

FIG. 3 illustrates an example manner of implementing the example digital baseband processor 225 of FIG. 2. The example digital baseband processor 225 of FIG. 3 generally includes a receiver 310 and any of a variety of CDMA transmitters 315.

To convert data 317 received from a medium access controller (e.g., the example medium access controller 230 of FIG. 2) into CDMA transmit signals 318, the example transmitter 315 of FIG. 3 includes any of a variety channel encoders 320, any of a variety of modulators 325, and any of a variety of spreaders 330. The example channel encoder 320 of FIG. 3 includes, among other things, the following functions: channel encoding, cyclic redundancy check (CRC) generation, conversion to blocks of data, rate matching, interleaving, multiplexing, etc. The example modulator 325 of FIG. 3 modulates (e.g., using quadrature phase-shift keyed (QPSK) or quadrature amplitude modulation (QAM), etc.) the output of the channel encoder 320 which is then multiplied with a pseudo-noise (PN) code sequence by the example spreader 330 to create the digital CDMA transmit signal 318. In the example of FIG. 3, the PN code sequence used to spread the transmit signal 318 is formed as an exclusive-or of a cell specific PN code sequence and a channel specific PN code sequence.

To help mitigate the effects of multipath interference and to despread received signals, the example receiver 310 of FIG. 3 includes an equalizer and despreader 335 constructed in accordance with the teachings of the invention. As illustrated in FIG. 3, the example equalizer and despreader 335 can equalize, despread and/or combine CDMA signals received via two (2) antennas RX_ant0 and RX_ant1 (e.g., the example antennas 210, 212 of FIG. 2). An example manner of implementing the example equalizer and despreader 335 is discussed below in connection with FIG. 4.

In the example of FIG. 3, digital samples received from an analog baseband processor (e.g., the example analog baseband processor 220 of FIG. 2) are sampled at a sampling rate which is four (4) times the chip-rate of the received CDMA signal. As used herein, the term "chip" refers to a portion of a CDMA signal that corresponds to one value of a PN code sequence used to spread/de-spread the CDMA signal. Moreover, the term "chip-rate" used herein refers to the rate at which chips of a CDMA signal are transmitted and/or received.

In the example of FIG. 3, the outputs of the example equalizer and despreader 335 are passed through any of a variety of demodulators 340 that de-maps symbols (e.g., QPSK or QAM symbols) back into a digital bit stream before being passed to any of a variety of channel decoders 345 that performs, among other things: de-multiplexing, de-interleaving, rate detection and de-rate matching, conversion from blocks, CRC checking, channel decoding, etc.

For ease of explanation and illustration, transmit signals occurring after the modulator 325 and receive signals occurring prior to the example demodulator 340 are shown as a single line. However, persons of ordinary skill in the art will readily appreciate that such signals include both in-phase (I) and quadrature (Q) components (i.e., they are complex valued signals). For example, the modulator 325 of FIG. 3 receives a stream of digital bits from the channel encoder 320 and converts them into I and Q streams that represent a sequence of points of a QAM constellation. The I and Q streams are each spread by the spreader 330 for subsequently digital-to-analog conversion and RF modulation as discussed above in connection with FIG. 2. For ease of illustration and discussion, throughout the following disclosure signals will be illustrated using single lines and/or discussed in the singular even though, as readily understood by persons of ordinary skill in the art, they are complex-valued and/or include both I and Q components.

While an example manner of implementing the example digital baseband processor 225 is illustrated in FIG. 3, the digital baseband processor 225 may be implemented using any of a variety of other and/or additional processor(s), device(s), component(s), circuit(s), module(s), interface(s), block(s), etc. Further, the processor(s), device(s), component(s), circuit(s), module(s), element(s), interface(s), etc. illustrated in FIG. 3 may be combined, re-arranged, eliminated and/or implemented in any of a variety of ways. Additionally, the example transmitter 315, the example channel encoder 320, the example modulator 325, the example spreader 330, the example receiver 310, the example equalizer and despreader 335, the example demodulator 340, the example channel decoder 345 and/or, more generally, the example digital baseband processor 225 may be implemented as any combination of firmware, software, logic and/or hardware. Moreover, the example digital baseband processor 225 may include additional processor(s), device(s), component(s), circuit(s), interface(s), block(s) and/or module(s) than those illustrated in FIG. 3 and/or may include more than one of any or all of the illustrated processor(s), device(s), component(s), circuit(s), interface(s), block(s) and/or module(s).

Figure 4:
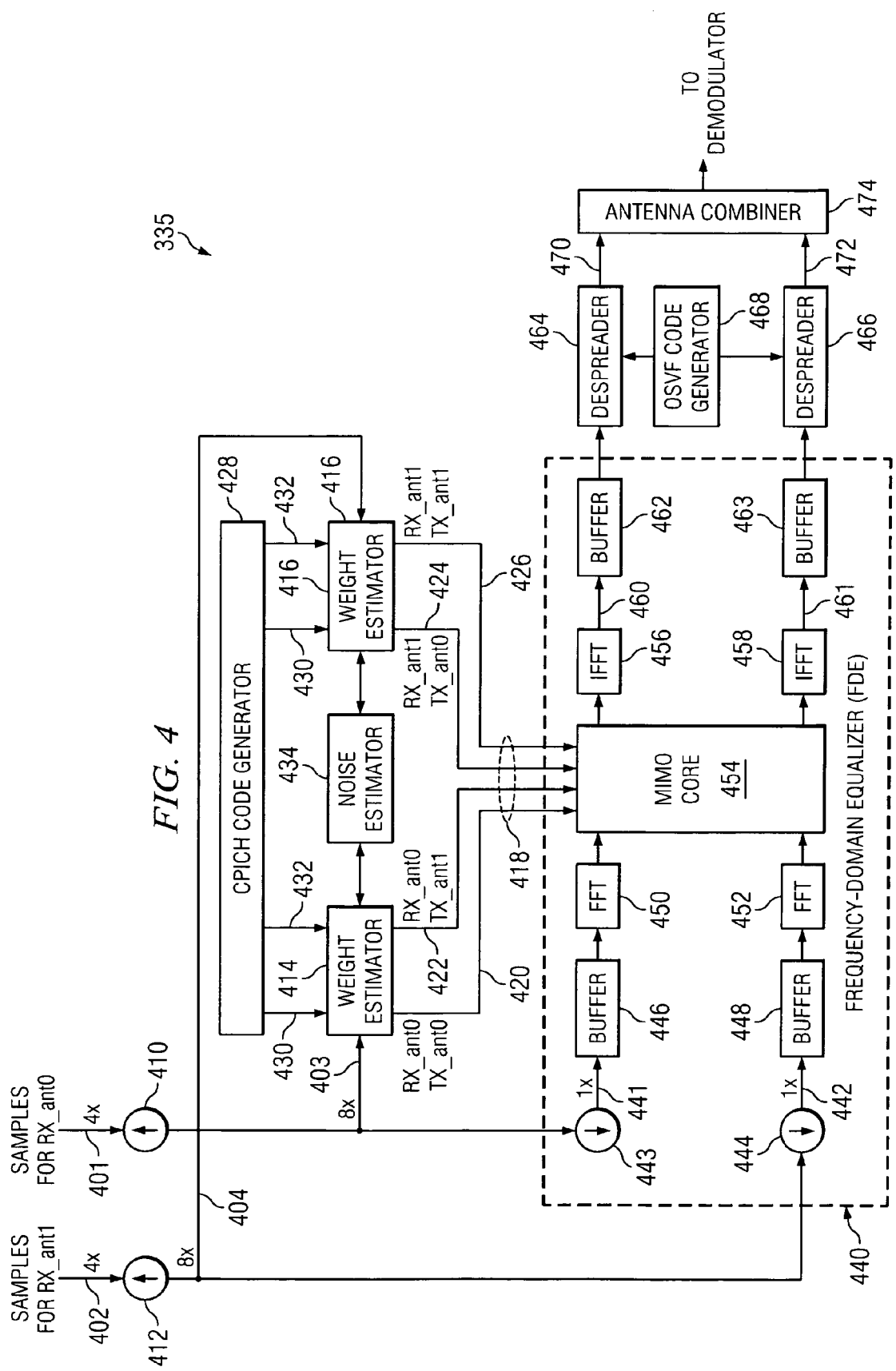
FIG. 4 illustrates an example manner of implementing the example equalizer and despreader of FIG. 3.

An example manner of implementing the example equalizer and despreader 335 of FIG. 4 constructed in accordance with the teachings of the invention is illustrated in FIG. 4. As illustrated in FIG. 4, the example equalizer and despreader 335 of FIG. 4, in general, implements (1) frequency-domain equalization for up to two (2) received CDMA signals, (2) multipath channel estimation to determine equalizer coefficients, (3) noise estimation, (4) despreading and (5) antenna combining.

As discussed above in connection with FIG. 3, the example equalizer and despreader 335 of FIG. 4 receives two (2) streams of four-times (4×) oversampled signals 401 and 402. Each of the streams is associated with a respective one of the antennas RX_ant0 and RX_ant1 (e.g., the example antennas 210 and 212 of FIG. 2). As used herein, oversampled rates are described with respect to the chip-rate underlying a CDMA signal.

To upsample the received signals 401 and 402 to 8-times (8×) oversampled signals 403 and 404, respectively, the example equalizer and despreader 335 of FIG. 4 includes any of a variety of upsamplers 410 and 412. The example upsamplers 410 and 412 of FIG. 4 perform linear interpolation to realize a factor of two (2×) upsampling. For example, the upsampler 410 computes an average of each pair of adjacent incoming samples 401 to determine the value of a new sample that is inserted between the two adjacent incoming samples 401 at its outputs 403.

To determine equalizer coefficients (i.e., equalizer weights), the example equalizer and despreader 335 of FIG. 4 includes weight estimators 414 and 416. The example weight estimators 414, 416 of FIG. 4 perform fractionally-spaced channel estimation based on the 8× oversampled signals 403, 404, and compute equalizer coefficients 418 based on the fractionally-spaced channel estimates. An example manner of implementing either or both of the example weight estimators 414, 416 and/or processes for performing fractional-spaced channel estimation and equalizer coefficient computation are discussed below in connection with FIGS. 7-15. However, persons of ordinary skill in the art will readily appreciate that other methods of performing channel estimation and/or equalizer coefficient computation may be used. For example, channel estimation may be done using a received signal 401, 402, 403 and/or 404 sampled at any of a variety of sampling rates such as the chip-rate (i.e., not oversampled).

In the example of FIG. 4, the example weight estimator 414 performs channel estimation and equalizer coefficient computations based on the 8× oversampled signal 403 for RX_ant0, and the example weight estimator 416 performs channel estimation and equalizer coefficient computation based on the 8× oversampled signal 404 for RX_ant1. Because in some wireless system configurations a wireless base station (e.g., the example base station 110 of FIG. 1) may transmit the same information via two CDMA signals and two transmit antennas, the example weight estimators 414, 416 can compute equalizer coefficients 418 for different combinations of signals received via the transmit and receive antennas. For example, the example weight estimator 414 can compute equalizer coefficients 420 for signals received at RX_ant0 via a transmit antenna TX_ant0 and can also compute equalizer coefficients 422 for signals received at RX_ant0 via a transmit antenna TX_ant1. The example weight estimator 416 can likewise compute equalizer coefficients 424 for signals received at RX_ant1 via a transmit antenna TX_ant0 and can also compute equalizer coefficients 426 for signals received at RX_ant1 via a transmit antenna TX_ant1.

To provide the code sequence(s) 430 and/or 432 used by the example weight estimators 414, 416 to despread the received signals 403, 404, the example equalizer and despreader 335 of FIG. 4 includes any of a variety of common pilot channel (CPICH) code generators 428. The example CPICH code generator 428 of FIG. 4 multiplies CPICH symbols with a PN code sequence. The CPICH symbols are transmitted by a wireless base station on the CPICH and are know a priori to the base station 110 and the CPICH code generator 428. The PN code sequence is an exclusive-or of the cell specific PN code sequence and a CPICH specific code sequence. Because the duration of each CPICH symbol is multiple chips (e.g., 256), the multiplication of the CPICH symbols and the PN code sequence multiplies each CPICH symbol by F chips of the PN code sequence, where F is the duration of the PN code sequence. Since the CPICH symbols may be different for two transmit antennas, the example CPICH code generator 428 provides a code sequence 430 for TX_ant0 and a code sequence 432 for TX_ant1.

To estimate a power and/or variance $\sigma_n^2$ of additive noise that was introduced to the received signals 401, 402 during transmission by a wireless base station, during transmission via the wireless channel(s), and/or during reception at a receiver, the example equalizer and despreader 335 of FIG. 4 includes a noise estimator 434. Using any of a variety of method(s), algorithm(s) and/or technique(s), the example noise estimator 434 of FIG. 4 estimates, determines and/or computes the amount of additive noise present in the received signals 401, 402. Example manners of implementing the example noise estimator 434 are discussed below in connection with FIGS. 20-26.

If a received chip-level signal, which has been distorted by multipaths, is sufficiently equalized prior to correlation with a spreading code (i.e., prior to despreading), then the receiver can subsequently process the equalized signal as if only a single path had been present. Assuming orthogonal spreading sequences, an equalizer can largely restore the orthogonality of multiple codes that started out orthogonal at the transmitter even in the presence of multiple transmission paths. Moreover, implementing equalization of chip-level signals, rather than symbol-level signals, allows the application of equalization to wireless communication systems utilizing long spreading sequences.

To equalize the upsampled received signals 403, 404, the example equalizer and despreader 335 of FIG. 4 includes a frequency-domain equalizer (FDE) 440. In general, the example FDE 440 of FIG. 4 (a) downsamples the upsampled received signal(s) 403, 404, (b) Fourier transforms the downsampled received signal(s) 403, 404 into the frequency-domain, (c) performs equalization in the frequency-domain, and (d) inverse Fourier transforms the equalized signal(s) back to the time-domain. The number of upsampled received signals 403, 404 processed by the example FDE 440 (e.g., one or two) depends upon the number of active receive antennas.

In more detail, to downsample the received signal(s) 403, 404 to chip-rate sampled data-path signal(s) 441 and 442, respectively, the example FDE 440 of FIG. 4 includes any of a variety of downsamplers 443 and 444. The example downsamplers 443 and 444 of FIG. 4 perform downsampling by discarding seven (7) out of every eight (8) samples using a regular pattern. The phase of the downsampling performed by the example downsamplers 443, 444 (i.e., which of the eight (8) samples is kept) is chosen to maximize the channel response of the strongest multipath (i.e., the received version of the transmitted signal having a channel response with the largest magnitude).

To store the downsampled data-path signal(s) 441, 442 prior to conversion to the frequency-domain, the example FDE 440 of FIG. 4 includes any of a variety and/or size of buffers 446 and 448. The example buffers 446, 448 of FIG. 4 may be implemented using any variety and/or size of memory (-ies) and/or registers. While the example buffers 446, 448 are illustrated in FIG. 4 as being part of the example FDE 440 and/or, more generally, a part of the example equalizer and despreader 335, the buffers 446, 448 may be implemented separately from, and/or communicatively and/or electrically coupled to, the FDE 440 and/or the equalizer and despreader 335.

To transform a set of values stored in the buffer(s) 446, 448 to the frequency-domain, the example FDE 440 of FIG. 4 includes any of a variety of Fourier transformers 450 and 452. The example Fourier transformers 450, 452 of FIG. 4 implement any variety of Fourier transform such as a discrete Fourier transform (DFT) or a fast Fourier transform (FFT). The example Fourier transformers 450, 452 perform a sixty-four (64)-pt Fourier transform of the most recent sixty-four (64) values (i.e., chips, samples) stored in their respective buffer 446, 448.

To equalize the frequency-domain representations of the received signals 441, 442, the example FDE 440 of FIG. 4 includes a multiple-input multiple-out (MIMO) core 454. The example MIMO core 454 multiplies outputs of the Fourier transformers 450, 452 with respective ones of the equalizer coefficients and/or weights 418 as discussed below in connection with FIGS. 5, 6A, 6B, 6C, 16A, 16B and 20.

To transform equalized outputs of the MIMO core 454 back to the time-domain, the example FDE 440 of FIG. 4 includes any of a variety of Fourier transformers 456 and 458. The example Fourier transformers 456, 458 of FIG. 4 implement any variety of inverse Fourier transform such as an inverse DFT (IDFT) or an inverse FFT (IFFT). The example Fourier transformers 456, 458 each perform a sixty-four (64)-pt inverse Fourier transform storing their respective outputs 460 and 461 in respective output buffers 462 and 463.

The example buffers 462, 463 of FIG. 4 may be any of a variety and/or size of buffers and be implemented using any of a variety and/or size of memory(-ies) and/or registers. While the example buffers 462, 463 are illustrated in FIG. 4 as being part of the example FDE 440 and/or, more generally, a part of the example equalizer and despreader 335, the buffers 462, 463 may be implemented separately from, and/or communicatively and/or electrically coupled to, the FDE 440 and/or the equalizer and despreader 335.

While the example Fourier transformers 450, 452, 456 and 458 are illustrated in FIG. 4 as separate Fourier transformers, persons of ordinary skill in the art will readily appreciate that the transformers 450, 452, 456 and 458 may be implemented using any number of Fourier transformers, including, for example, one (1) transformer via multiplexed resource time-sharing. Moreover, persons of ordinary skill in the art will readily appreciate that a Fourier transformer 450, 452, 456 and/or 458 capable of implementing a FFT can also readily implement an IFFT, and vice versa.

In practice, the operations of the example Fourier transformers 450, 452, the example MIMO core 454 and the example Fourier transformers 456, 458 are carried out after each set of thirty-two (32)-chips is received and stored in the buffer(s) 443, 444. However, because the Fourier transformers 450, 452 perform 64-pt Fourier transforms, the example FDE 440 of FIG. 4 employs the overlap-and-save technique. As such, a channel matrix that represents the channel responses of the multipaths is a circulant matrix thereby allowing the example FDE 440 to perform equalization in the frequency-domain. So that only thirty-two (32) outputs of the FDE 440 are retained each time the example FDE 440 is operated, the first and the last sixteen (16) outputs of each of the output signals 460, 461 are discarded and the remaining outputs 460, 461 are stored in their respective buffers 462, 463.

Example methods and apparatus to implement the example FDE 440 of FIG. 4 and/or, more generally, to perform frequency-domain equalization are described in U.S. patent application Ser. No. 11/184,680 which is entitled "Frequency-domain Equalization" and which was filed Feb. 9, 2006. U.S. patent application Ser. No. 11/184,680 is hereby incorporated by reference in its entirety.

While an example manner of implementing the example FDE 440 is illustrated in FIG. 4, the FDE 440 may be implemented using any of a variety of other and/or additional technique(s), processor(s), device(s), component(s), circuit(s), module(s), interface(s), etc. For example, the FDE 440 may implement a technique utilizing a cyclic prefix and/or zero-padding. Further, the processor(s), device(s), component(s), circuit(s), module(s), element(s), interface(s), etc. illustrated in example FDE 440 of FIG. 4 may be combined, re-arranged, eliminated and/or implemented in any of a variety of ways. Additionally, the example downsamplers 443, 444, the example buffers 446, 448, the example Fourier transformers 450, 452, the example MIMO core 454, the example Fourier transformers 456, 458, the example buffers 462, 463 and/or the example FDE 440 may be implemented as any combination of firmware, software, logic and/or hardware. Moreover, the example FDE may include additional processor(s), device(s), component(s), circuit(s), interface(s) and/or module(s) than those illustrated in FIG. 4 and/or may include more than one of any or all of the illustrated processor(s), device(s), component(s), circuit(s), interface(s) and/or module(s).

To de-spread the equalized signal(s) 460, 461, the example equalizer and despreader 335 of FIG. 4 includes any of a variety of despreaders 464 and 466. The example despreaders 464, 466 correlate a respective equalized signal 460, 461 with a PN code sequence provided by an orthogonal variable spreading factor (OVSF) code generator 468 to identify the received symbols 470 and 472. In the example of FIG. 4, the PN code sequence used to despread the equalized signal(s) 460, 461 is formed as an exclusive-or of a cell specific PN code sequence and a channel specific PN code sequence.

To combine the received symbols 470, 472, the example equalizer and despreader 335 of FIG. 4 includes any of a variety of antenna combiner 474. Using any of a variety of technique(s), method(s), algorithm(s), circuit(s) and/or logic, the example antenna combiner 474 combines the decoded symbols 470, 472 based on the number of active transmit antennas and/or the number of active receive antennas. For example, the antenna combiner 474 may combine the decoded symbols 470, 472 in accordance with space-time transmit diversity (STTD) and/or closed-loop transmit diversity (CLTD). Example manners of implementing the example antenna combiner 474 are illustrated in FIGS. 4A, 4B and 16A.

While an example manner of implementing the example equalizer and despreader 335 is illustrated in FIG. 4, the equalizer and despreader 335 may be implemented using any of a variety of other and/or additional technique(s), processor(s), device(s), component(s), circuit(s), module(s), interface(s), etc. Further, the processor(s), device(s), component(s), circuit(s), module(s), element(s), interface(s), etc. illustrated in FIG. 4 may be combined, re-arranged, eliminated and/or implemented in any of a variety of ways. Additionally, the example upsamplers 410, 412, the example weight estimators 414, 416, the example CPICH code generator 428, the example noise estimator 434, the example FDE 440, the example despreaders 464, 466, the example OSVF code generator 468, the example antenna combiner 474 and/or the example equalizer and despreader 335 may be implemented as any combination of firmware, software, logic and/or hardware. Moreover, the example equalizer and despreader may include additional processor(s), device(s), component(s), circuit(s), interface(s) and/or module(s) than those illustrated in FIG. 4 and/or may include more than one of any or all of the illustrated processor(s), device(s), component(s), circuit(s), interface(s) and/or module(s).

FIG. 4A illustrates an example manner of implementing the example antenna combiner 474 of FIG. 4. The example implementation of FIG. 4A is suitable for a closed-loop transmit diversity configuration (e.g., two transmit antennas and a single receive antenna). To determine weighting of the two equalized and despread signals 470 and 472, the example antenna combiner 474 of FIG. 4A includes any of a variety of weight verification units 480. Using any of a variety of method(s), algorithm(s), logic, and/or technique(s), the example weight verification unit 480 of FIG. 4A performs antenna verification and determines antenna weights w1 482 and w2 484.

To combine the two equalized and despread signals 470 and 472, the example antenna combiner 474 of FIG. 4A provides any of a variety of multipliers 485 and 490, and any of a variety of adders 495. To balance the contribution of each of the equalized and despread signals 470 and 472, the example multiplier 485 multiplies the symbol 470 with the antenna weight w1 482 and the example multiplier 490 multiplies the symbol 472 with the antenna weight w2 484. The example summer 495 of FIG. 4A then sums the outputs of the multipliers 485, 490. The received signal 497 is then provided to remaining portions of a wireless receiver (e.g., to the example medium access controller 230 of FIG. 2) for further processing.

Persons of ordinary skill in the art will readily appreciate that the example antenna combiner 474 of FIG. 4A can be implementing using a single multiplication. In such an example, the symbol 470 is multiplied by a ratio of the weights w1 482 and w2 484, and the adder 495 adds the scaled symbol 470 and the unmodified symbol 472.

FIG. 4B illustrates an example manner of implementing the example antenna combiner 474 of FIG. 4. The example implementation of FIG. 4B is suitable for a receive antenna diversity configuration (e.g., a single transmit antenna and two receive antennas). To combine the equalized and despread signals 470 and 472 received via two receive antennas, the example antenna combiner 474 of FIG. 4B includes any of a variety of summers 498. The example summer 498 adds together the equalized and despread symbols 470 and 472 to form a signal 499 that is provided to remaining portions of a wireless receiver (e.g., to the example medium access controller 230 of FIG. 2) for further processing.

While an example manner of implementing the example antenna combiners 474 are illustrated in FIGS. 4A and 4B, the antenna combiners 474 may be implemented using any of a variety of other and/or additional technique(s), processor(s), device(s), component(s), circuit(s), module(s), interface(s), etc. Further, the processor(s), device(s), component(s), circuit(s), module(s), element(s), interface(s), etc. illustrated in FIGS. 4A and/or 4B may be combined, re-arranged, eliminated and/or implemented in any of a variety of ways. Additionally, the example weight verification unit 480, the example multipliers 485, 490 and/or the example summers 495, 498 may be implemented as any combination of firmware, software, logic and/or hardware. Moreover, the example equalizer and despreader may include additional processor(s), device(s), component(s), circuit(s), interface(s) and/or module(s) than those illustrated in FIGS. 4A and/or 4B and/or may include more than one of any or all of the illustrated processor(s), device(s), component(s), circuit(s), interface(s) and/or module(s).

FIG. 5 illustrates an example manner of implementing the example MIMO core 454 of FIG. 4. In general, the example MIMO core 454 as illustrated in FIG. 5 multiplies inputs 501 and 502 with respective ones of the equalizer coefficients 420, 422, 424 and 426, and adds together multiplier outputs. While for ease of illustration, each path in FIG. 5 is illustrated as a single line, persons of ordinary skill in the art will readily appreciate that each line represents a sequence of complex values. Each of the complex values 501, 502 of FIG. 5 represent the outputs of the Fourier transformers 450, 452, respectively, at a set of frequencies. Likewise, each of the complex values 420, 422, 424 and 426 represent equalizer coefficients for corresponding frequencies. Accordingly, the methods and/or operations illustrated in FIG. 5 are carried out for each of the frequencies represented by the inputs 501, 502 and the coefficients 420, 422, 424 and 426.

To perform complex multiplications of inputs 501 and 502 with corresponding coefficients 420, 422, 424 and 426, the example MIMO core of FIG. 5 includes any of a variety of multipliers 505, 510, 515 and 520. As illustrated in FIG. 5, inputs 501 corresponding to RX_ant0 are multiplied by the example multiplier 505 with coefficients 420 corresponding to multipaths between TX_ant0 and RX_ant0. Similarly, inputs 501 corresponding to RX_ant0 are multiplied by the example multiplier 510 with coefficients 422 corresponding to multipaths between TX_ant1 and RX_ant0. Likewise, inputs 502 corresponding to RX_ant1 are multiplied with coefficients 424 for RX_ant1 and TX_ant0 by the multiplier 515, and inputs 501 corresponding to RX_ant0 are multiplied with coefficients 426 for RX_ant1 and TX_ant1 by the multiplier 520.

To combine signals received from particular transmit antennas, the example MIMO core 454 of FIG. 5 includes any of a variety of adders 525 and 530. In the example of FIG. 5, the example adder 525 combines the signals received from TX_ant0 535 by adding together the outputs of multiplier 505 and the multiplier 515. Likewise, the example adder 530 combines the signals received from TX_ant1 540 by adding together the outputs of multiplier 510 and multiplier 520.

While an example manner of implementing the example MIMO core 454 is illustrated in FIG. 5, the MIMO core 454 may be implemented using any of a variety of other and/or additional technique(s), processor(s), device(s), component(s), circuit(s), module(s), interface(s), etc. Further, the processor(s), device(s), component(s), circuit(s), module(s), element(s), interface(s), etc. illustrated in FIG. 5 may be combined, re-arranged, eliminated and/or implemented in any of a variety of ways. For example, a single multiplier and accumulator (MAC) unit and/or circuit could be used to implement the multipliers 505, 510, 515, 520 and/or the example adders 525, 530. Additionally, the example multipliers 505, 510, 515, 520, the example adders 525, 530 and/or the example MIMO core 454 may be implemented as any combination of firmware, software, logic and/or hardware. Moreover, the example MIMO core may include additional processor(s), device(s), component(s), circuit(s), interface(s) and/or module(s) than those illustrated in FIG. 5 and/or may include more than one of any or all of the illustrated processor(s), device(s), component(s), circuit(s), interface(s) and/or module(s).

As discussed above, the example equalizer and despreader 335, the example FDE 440 and the example MIMO core 454 of FIGS. 3, 4, 4A, 4B and/or 5 can support various combinations and/or numbers of transmit antennas and receive antennas. FIGS. 4 and 5 illustrate examples that support two transmit antennas TX_ant0 and TX_ant1 and two receive antennas RX_ant0 and RX_ant1. To support other combinations and/or numbers of transmit antennas and/or receive antennas, various element(s), device(s), module(s), circuit(s) and/or block(s) of FIGS. 4, 4A, 4B and/or 5 can be bypassed and/or disabled.

Figure 6C:
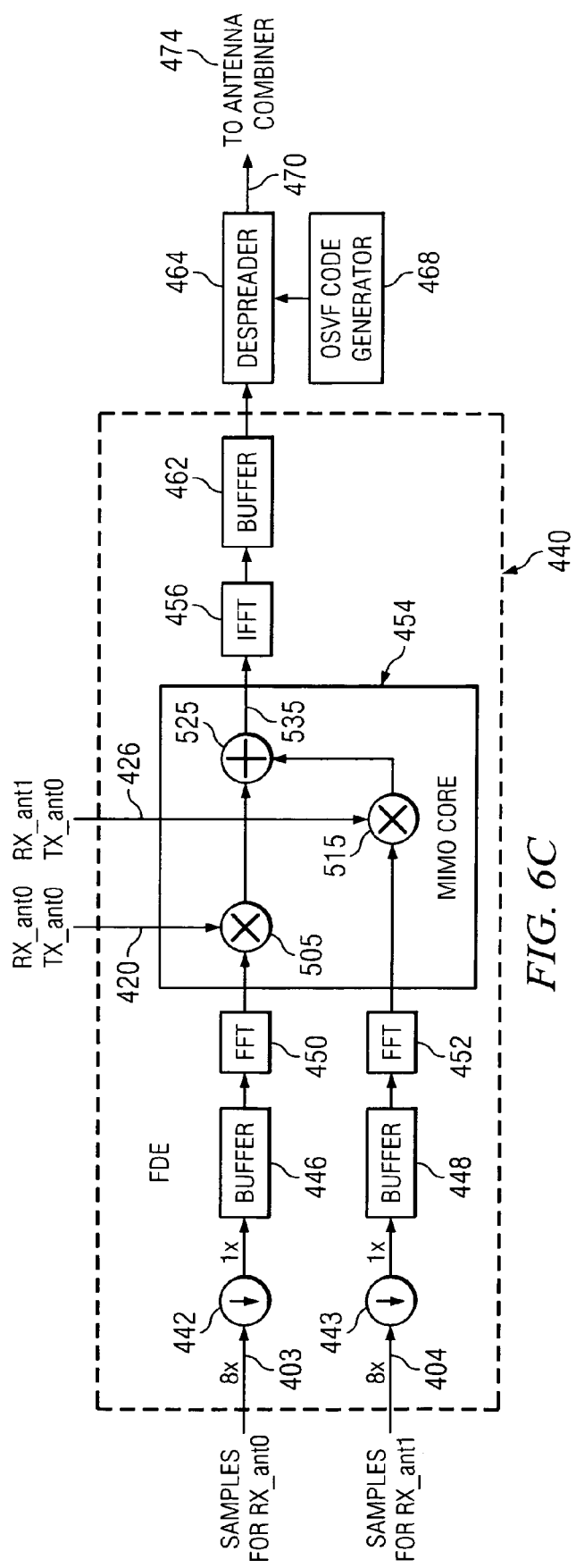

FIGS. 6A, 6B and 6C illustrate example configurations of the example equalizer and despreader 335, the example FDE 440 and the example MIMO core 454 of FIGS. 4 and/or 5 to support less than two transmit antennas and/or less than two receive antennas. The element(s), device(s), module(s), circuit(s) and/or block(s) referenced in FIGS. 6A, 6B and 6C are identical to those discussed above in connection with FIGS. 4 and/or 5 and, thus, the description of identical element(s), device(s), module(s), circuit(s) and/or block(s) are not repeated here. Instead, identical element(s), device(s), module(s), circuit(s) and/or block(s) are illustrated with identical reference numerals in FIGS. 4, 5, 6A, 6B and 6C, and the interested reader is referred back to the descriptions presented above in connection with FIGS. 4 and/or 5 for a full discussion of those like numbered structures.

FIG. 6A illustrates an example configuration where CDMA signals are transmitted via a single transmit antenna TX_ant0 and received via a single receive antenna RX_ant0. Accordingly, only a single data-path through the example FDE 440 of FIG. 4 and a single despreader 464 is utilized. Additionally, only the example multiplier 505 of the example MIMO core 454 of FIG. 5 is utilized.

FIG. 6B illustrates an example configuration where CDMA signals are transmitted via two transmit antennas TX_ant0 and TX_ant1 and received via a single receive antenna RX_ant0. Accordingly, only a single Fourier transformer 450 is utilized before the MIMO core 454, while both of the Fourier transformers 456, 458 and the despreaders 464, 466 are utilized. Since a CDMA signal is received from the second transmit antenna TX_ant1, a second multiplier 510 of the example MIMO core 454 of FIG. 5 is utilized.

FIG. 6C illustrates an example configuration where CDMA signals are transmitted via a single transmit antennas TX_ant0 and received via two receive antennas RX_ant0 and RX_ant1. Accordingly, both of the Fourier transformers 450, 452 are utilized before the MIMO core 454, while only a single Fourier transformers 456 and a single despreader 464 is utilized. Since a CDMA signal is received via two receive antennas, a second multiplier 515 and an adder 525 of the example MIMO core 454 of FIG. 5 is utilized.

II. Fractional-spaced Channel Estimation

Figure 7:
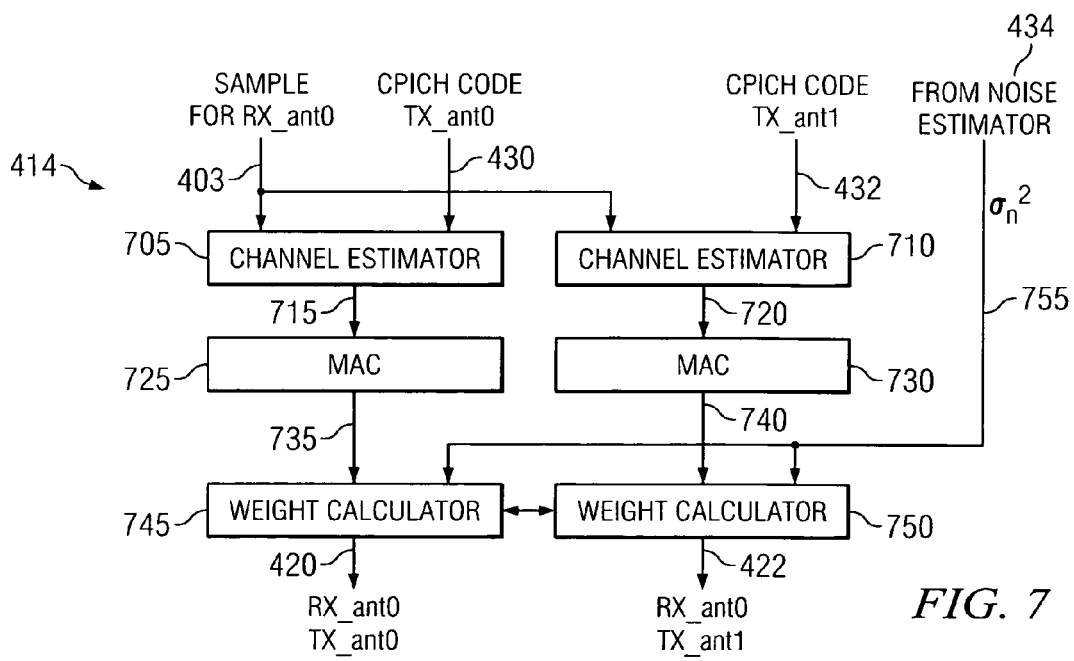
FIG. 7 illustrates an example manner of implementing the example weight estimator of FIG. 4.

FIG. 7 illustrates an example manner of implementing either or both of the example weight estimators 414, 416 of FIG. 4. However, while FIG. 7 can represent either the weight estimator 414 or weight estimator 416, for ease of discussion the example device of FIG. 7 will be referred to as weight estimator 414. For additional ease of discussion the example weight estimator 414 is described with reference to receive antenna RX_ant0. However, persons of ordinary skill in the art will appreciate that the example weight estimator 414 of FIG. 7 could also be used to compute equalizer coefficients for receive antenna RX_ant1.

To perform fractional-spaced channel estimation, the example weight estimator 414 of FIG. 7 includes channel estimators 705 and 710. The example channel estimator 705 of FIG. 7 estimates channel responses 715 for the multipaths associated with the wireless transmission paths between TX_ant0 and RX_ant0, while the example channel estimator 710 estimates channel responses 720 for the multipaths associated with wireless transmission paths between TX_ant1 and RX_ant0. An example manner of implementing the example channel estimators 705, 710 is discussed below in connection with FIG. 8.

To compute at least a partial Fourier transform of the channel estimates 715 and 720, the example weight estimator 414 of FIG. 7 includes any of a variety of MAC units 725 and 730, respectively. That is, the example MAC units 725, 730 compute at least a portion of the outputs of a Fourier transform based on at least a partial set of inputs. While two MAC units 725, 730 are illustrated in FIG. 7 any number of MAC units (including one (1)) may, additionally or alternatively, be used. Moreover, any of a variety of Fourier transformers may be used instead of the MAC units 725, 730.

Figure 9:
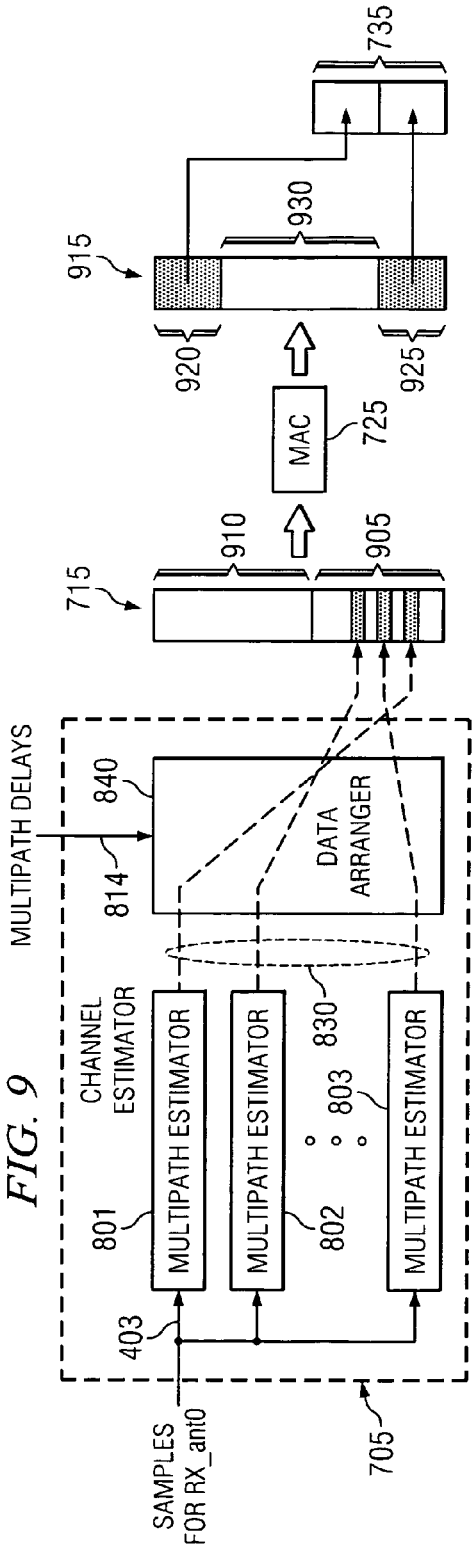
FIG. 9 illustrates an example operation of the example data arranger of FIG. 8 and/or, more generally, the example weight estimator of FIG. 7.

As described below in connection with FIG. 9, the example MAC units 725, 730 compute a portion of a Fourier transform of the channel estimates 715, 720, respectively. In particular, the MAC units 725, 730 compute only the frequency-domain channel estimates 735 and 740, respectively, that correspond to frequencies at which equalization will be performed by a frequency-domain equalizer (e.g., the example FDE 440 of FIG. 4). As such, the MAC units 725, 730 perform the necessary interpolation between the fractional-spaced channel estimates 715, 720 and the chip-spaced frequency-domain equalizer coefficients 420, 422 utilized by the frequency-domain equalizer. As illustrated in FIG. 9, because only a portion of the Fourier transform outputs 735, 740 need be computed, and because only a portion of the inputs to the Fourier transform are non-zero, the example MAC units 725, 730 of FIG. 7 need not implement a full Fourier transformer. In particular, the example MAC units 725, 730 of FIG. 7 carry out the mathematical expression illustrated in EQN (1) for the desired frequencies of interest, while taking into account that only a portion of the inputs to the Fourier transforms are non-zero.

$$X[k] = \sum_{n=0}^{N-1} x[n]e^{-j(2\pi/N)kn}, \quad \text{EQN (1)}$$

where x[n] are the inputs of the Fourier transform created from the channel estimates 715, 720, X[k] are the outputs 735, 740 of the Fourier transform (i.e., frequency-domain channel estimates 735, 740) and are computed at indices k corresponding to the frequencies of interest, and N is the size of the Fourier transform. In the example of FIGS. 7 and 9, N has a value of 512, but other values may alternatively be employed. As discussed below in connection with the example of FIG. 9, the non-zero inputs x[n] include the channel estimates 715, 720, where the locations of the channel estimates 715, 720 within the inputs x[n] is chosen based upon the multipath delay associated with each of the channel estimates 715, 720.

To compute the equalizer weights 420 and 422, the example weight estimator 414 of FIG. 7 includes weight calculators 745 and 750, respectively. The example weight calculators 745, 750 compute the equalizer weights 420, 422 at the frequencies of interest based on the frequency-domain channel estimates 735, 740 and a noise variance 755 computed by a noise estimator (e.g., the example noise estimator 434 of FIGS. 4, 20, 21 or 24). Example manners of implementing the example weight calculators 745, 750 are discussed below in connection with FIGS. 10 and 18.

FIG. 7 illustrates the use of two channel estimators 705 and 710 having substantially similar implementations. Additional and/or alternative methods and apparatus to obtain channel estimates for two transmit antennas are described in U.S. patent application Ser. No. 11/151,104 which is entitled "Methods and Apparatus to Facilitate Improved Code-Division Multiple-Access Receivers", which was filed on Jun. 13, 2005, and which claims priority from U.S. Provisional Application Ser. No. 60/601,375 which was filed on Aug. 12, 2004. U.S. patent application Ser. Nos. 11/151,104 and 60/601,375 are hereby incorporated by reference in their entireties.

While an example manner of implementing the example weight estimator 414 is illustrated in FIG. 7, the weight estimator 414 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 7 may be combined, re-arranged, eliminated and/or implemented in any of a variety of ways. For example, a single MAC circuit and/or unit could be used to implement the example MAC units 725, 730, the example weight calculator 745 and/or the example weight calculator 750. Additionally, the example channel estimators 705, 710, the example MAC units 725, 730, the example weight calculators 745, 750 and/or the example weight estimator 414 may be implemented as any combination of firmware, software, logic and/or hardware. Moreover, the example weight estimator 414 may include additional processor(s), device(s), component(s), circuit(s), interface(s) and/or module(s) than those illustrated in FIG. 7 and/or may include more than one of any or all of the illustrated processor(s), device(s), component(s), circuit(s), interface(s) and/or module(s).

Figure 8:
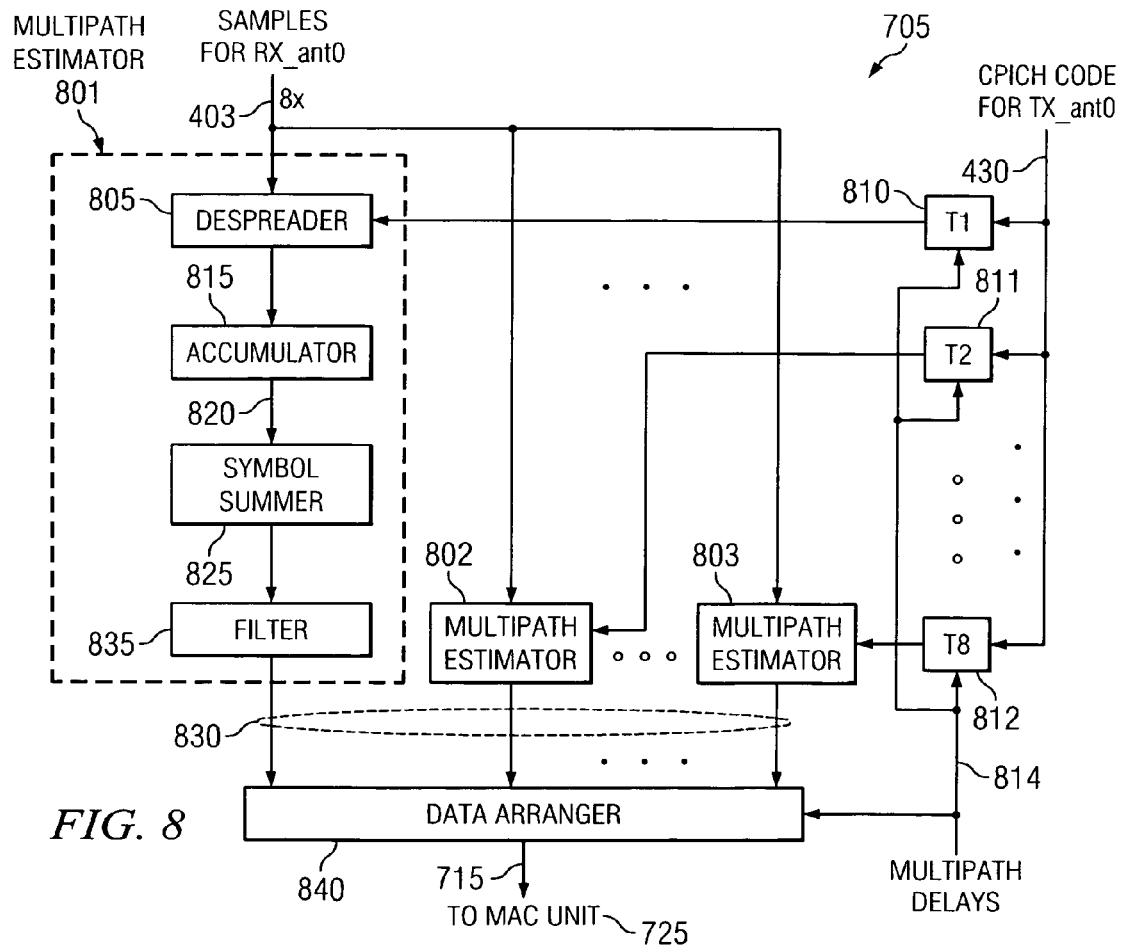
FIG. 8 illustrates an example manner of implementing any of the example channel estimators of FIG. 7.

FIG. 8 illustrates an example manner of implementing either or both of the example channel estimators 705 and 710 of FIG. 7. While either of the channel estimators 705, 710 may be represented by FIG. 8, for ease of discussion, the example device of FIG. 8 will be referred to as channel estimator 705. To estimate a channel response for each of one or more multipaths present in the input signal 403, the example channel estimator 705 of FIG. 8 includes a plurality of multipath estimators, three of which are illustrated in FIG. 8 with reference numerals 801, 802 and 803. The number of multipath estimators 801-803 implemented by the example channel estimator 705 depends upon the number of multipath channel responses 830 estimated by the channel estimator 705. The multipath estimators 801-803 are substantially identical.

To despread the 8× oversampled signal 403 and to eliminate interference from non-pilot channels (e.g., other, undesired, downlink channels) into each multipath, and to suppress interference from other multipaths, each of the example multipath estimators 801-803 includes a despreader 805. The example despreader 805 of FIG. 8 despreads the input signal 403 by multiplying the input signal 403 with a delayed PN code sequence specific to a particular multipath. Because the input signal 403 is 8× oversampled, the example despreader 805 selects and/or picks one (1) sample out of every eight (8) samples 403 based on the delay of the associated multipath before the multiplication is performed. Additionally or alternatively, any of a variety of downsamplers may be implemented and/or performed prior to the despreader 805 to select and/or pick the one (1) sample out of every eight (8) samples 403.

To form the delayed cell specific PN code sequences for each multipath (i.e., for each of the multipath estimators 801-803), the example channel estimator 705 of FIG. 8 includes a plurality of delay elements, three of which are shown in FIG. 8 with reference numerals 810, 811 and 812. Each of the example delay elements 810-812 of FIG. 8 delays the CPICH code 430 by an amount substantially corresponding to the multipath timing for its respective multipath (i.e., one of the delays 814 associated with the multipaths). Multipaths can be detected and/or multipath delays 814 determined using any of a variety of method(s), technique(s), logic and/or algorithm(s).

To extract received symbols, each of the example multipath estimators 801-803 of FIG. 8 includes a chip accumulator 815. The example chip accumulator 815 of FIG. 8 performs an accumulation over a number of chips (e.g., 256) to extract despread pilot channel symbols 820 (i.e., received symbols 820). The despread pilot channel symbols 820 for each multipath substantially comprise transmitted CPICH symbols convolved with a channel response for the multipath. If the transmitted CPICH symbols are identical, the despread pilot channel symbols 820 substantially comprise channel responses of each multipath scaled and rotated by the CPICH symbol.

When a wireless base station (e.g., the example base station 110 of FIG. 1) is using two-antenna transmit diversity for UMTS, then first CPICH symbols transmitted by a first transmit antenna TX_ant0 are orthogonal to second CPICH symbols transmitted by a second antenna TX_ant1 only when descrambled and summed over 512 chips. Thus, if transmit diversity is used, then in the illustrated example of FIG. 8, after despreading and summing over 256 chips worth, accumulation of the despread pilot symbol signals 820 over two symbols is performed, thereby effectively implementing despreading over 512 chips. If transmit diversity is not used by the wireless base station, then accumulation over 2 symbols need not be performed.

To perform accumulation over 2 symbols, each of the example multipath estimators 801-803 of FIG. 8 includes a symbol summer 825. In the illustrated example, the symbol summer 825 only operates when transmit diversity is used by the wireless base station. Alternatively, the symbol summer 825 is active regardless of whether or not the wireless base station is using transmit diversity. It will be readily apparent to persons of ordinary skill in the art that the number of chips accumulated by the chip accumulator 815 and/or the number of symbols summed by the symbols summer 825 can be modified from the illustrated example as long as the chosen values ensure orthogonality of the first and second CPICH symbols transmitted by the two transmit antennas. For example, the accumulator 815 could accumulate 512 chips worth of samples such that the example symbol summer 825 need not be included.

To obtain reliable channel estimates 830 for each multipath, each of the multipath estimators 801-803 includes a filter 835. The example filter 835 of FIG. 8 is a one-pole infinite impulse response (IIR) filter that provides a low-pass filtering (LPF) transfer function. The LPF transfer function serves to reduce out-of-band noise and to help smooth the channel estimates 830. It should be readily apparent to persons of ordinary skill in the art that the filter 835 could utilize finite impulse response (FIR) filters and/or any other suitable filter structure(s) or filtering arrangement(s).

To place and/or arrange the channel estimates 830 into a data structure, array and/or set of registers 715 for computation of at least a portion of a Fourier transform (e.g., for use by the example MAC units 725, 730 of FIG. 7), the example channel estimator 705 of FIG. 8 includes a data arranger 840. The example data arranger 840 of FIG. 8 places each of the channel estimates 830 into the Fourier transform inputs 715 based upon the multipath delay 814 associated with the channel estimate 830. For example, a channel estimate 830 having a multipath delay 814 of three (3) would be placed in the third ($3^{rd}$) Fourier transform input 715.

Persons of ordinary skill in the art will readily appreciate that if there are fewer channel estimates 830 (e.g., eight (8)) than there are Fourier transform inputs 715 (e.g., N=512), then a large number of the Fourier transform inputs 715 will be zero (0). Moreover, because in the example of FIG. 4, 7 and 8 the range of multipath delay values 814 (e.g., 64) is smaller than the size of the Fourier transform inputs 715, only a lower portion of the Fourier transform inputs 715 will contain non-zero values.

As discussed above, the example MAC units 725, 730 of FIG. 7 can take advantage of the scarcity of non-zero values within the inputs. 715 and/or the location of the non-zero values within a lower portion of the inputs 715 to reduce memory and/or computational requirements. For example, a size of the Fourier inputs 715 can be reduced based on the maximum supported multipath delay to reduce the size of a memory(-ies) and/or number of registers required to implement the Fourier inputs 715. Additionally or alternatively, when the MAC units 725, 730 carry out the mathematical expression of EQN (1), the MAC units 725, 730 can limit the range of n used in the summation to the maximum support multipath delay. An example operation of the MAC units 725, 730 and the example data arranger 840 of FIGS. 7 and 8 is discussed below in connection with FIG. 9.

While an example manner of implementing the example channel estimator 705 is illustrated in FIG. 8, the channel estimator 705 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 8 may be combined, re-arranged, eliminated and/or implemented in any of a variety of ways. Additionally, the example multipath estimators 801-803, the example delays 810-812, the example despreader 805, the example accumulator 815, the example symbol summer 825, the example filter 835, the example data arranger 840 and/or the example channel estimator 705 may be implemented as any combination of firmware, software, logic and/or hardware. Moreover, the example channel estimator 705 may include additional processor(s), device(s), component(s), circuit(s), interface(s) and/or module(s) than those illustrated in FIG. 8 and/or may include more than one of any or all of the illustrated processor(s), device(s), component(s), circuit(s), interface(s) and/or module(s).

FIG. 9 illustrates an example operation of the example channel estimator 705, 710, the example data arranger 840, the example MAC unit 725, 730 and/or, more generally, the example weight estimator 414, 416 of FIGS. 4, 7 and/or 8. As discussed above in connection with FIG. 8, the example channel estimator 705 includes a plurality of multipath estimators 801-803 to estimate multipath channel responses 830 for a plurality of multipaths associated with an 8× oversampled received signal 403.

As illustrated in FIG. 9, the data arranger 840 places, stores and/or locates a particular channel response 830 within the set of Fourier transform inputs 715 based upon the multipath delay 814 associated with the multipath channel response 830. Given a maximum supported multipath delay, the channel responses 830 will all be placed, stored and/or located within a lower portion 905 of the Fourier transform inputs 715. The remaining upper portion 910 of the Fourier transform inputs 715 will contain zeros. Since the size of the portion 905 is typically larger than the number of multipath estimators 801-803, there will also be zero values within the portion 905.

The example MAC unit 725 of FIGS. 7 and/or 9 computes a Fourier transform of the inputs 715. Because the Fourier transform inputs 715 represent fractional-spaced channel estimates 830, outputs 915 of the MAC unit 725 represents a larger and/or high-frequency set of frequencies than that utilized by a frequency-domain equalizer (e.g., the example FDE 440 of FIG. 4). As such, only a part of the outputs 915 are required. Accordingly, the example MAC unit 725 of FIGS. 7 and/or 9 only computes portions 920 and 925 of the outputs 915 as illustrated in FIG. 9. The portions 920 and 925 collectively represent the frequency-domain representation of the multipath channel responses 735 at the frequencies of interest to the frequency-domain equalizer. The size of the portions 920 and 925 and, thus, a resultant size of the frequency-domain channel responses 735 are chosen based upon a Nyquist frequency associated with the chip-rate sampling frequency utilized by the frequency-domain equalizer. As such, the frequency-domain channel responses 735 span the set of frequencies represented by Fourier transform outputs with the frequency-domain equalizer (e.g., outputs of the Fourier transformer 450, 452). As discussed above in connection with FIG. 7 and below in connection with FIG. 10, the weight calculator 745, 750 computes the equalizer weights 420, 422 from the frequency-domain channel responses 735.

In the examples of FIGS. 7 and/or 9, the MAC unit 725 need not compute the remaining portion 930 of the outputs 915. However, the MAC unit 725 could implement a full Fourier transform, thus computing all of the outputs 915 even though only the portions 920 and 925 will be utilized.

Figure 10:
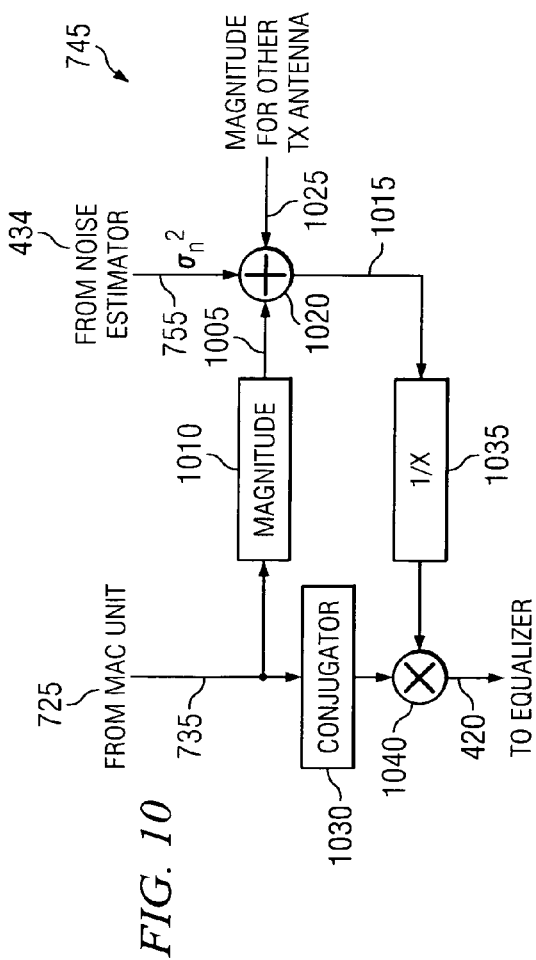
FIG. 10 illustrates an example manner of implementing any of the example weight calculators of FIG. 7.

FIG. 10 illustrates an example manner of implementing either or both of the example weight calculators 745 and 750 of FIG. 7. While either of the example weight calculators 745, 750 may be represented by FIG. 10, for ease of discussion the device of FIG. 7 will be referred to as weight calculator 745. In general, the weight calculator 745 computes a frequency-domain equalizer coefficient/weight 420 for each of the frequency-domain outputs 735. That is, the operation of the example weight calculator 745 is carried out for each of the frequency-domain channel estimates 735 to compute a set of equalizer coefficients 420. In some examples, the example weight calculator 745 computes a particular equalizer coefficient 420 by carrying out the example mathematical expression of EQN (2)

$$W[k] = \frac{F^*[k]}{|F[k]|^2 + \sigma_n^2}, \quad \text{EQN (2)}$$

where F[k] is a particular one of the frequency-domain channel estimates 735, W[k] is a corresponding equalizer weight 420, $\sigma_n^2$ is an estimated variance 755 of additive noise, ( )* is the complex conjugate operator, and | | is the complex magnitude operator.

When the example weight calculator 745 of FIG. 10 is computing a equalizer weight 420 for a transmit diversity configuration, the example weight calculator 745 computes a particular equalizer coefficient 420 by carrying out the example mathematical expression of EQN (3)

$$W[k] = \frac{F^*[k]}{|F[k]|^2 + |F_2[k]|^2 + \sigma_n^2}, \quad \text{EQN (3)}$$

where F[k] is a particular one of the frequency-domain channel estimates 735 for a particular receive antenna (e.g., RX_ant0) and a first transmit antenna (e.g., TX_ant0), and $F_2[k]$ is a corresponding one of the outputs 735 for the same receive antenna (e.g., RX_ant0), but for a second transmit antenna (e.g., TX_ant1).

To compute the magnitude 1005 of a particular frequency-domain channel estimate 735, the example weight calculator 745 of FIG. 10 includes a magnitude calculator 1010. Using any of a variety of method(s), technique(s), circuit and/or logic, the example magnitude calculator 1010 of FIG. 10 computes the squared magnitude of the complex value 735.

To compute a sum 1015 of the squared magnitude 1005 and the estimate additive noise variance $\sigma_n^2$ 755, the example weight calculator 745 of FIG. 10 includes any variety of adder 1020. For a transmit diversity configuration, the example adder 1020 of FIG. 10 also adds the squared magnitude 1025 of a frequency-domain channel estimate (e.g., the squared frequency-domain channel estimate 740 of FIG. 7) for a second transmit antenna to the squared magnitude 1005 and the noise variance $\sigma_n^2$ 755.

To compute the complex conjugate of the particular frequency-domain channel estimate 735, the example weight calculator 745 of FIG. 10 includes any variety of complex conjugator 1030. To invert the sum 1015, the example weight calculator 745 of FIG. 10 includes any variety of inverter 1035.

To compute the coefficient 420, the example weight calculator 745 of FIG. 10 includes any variety of multiplier 1040. The example multiplier 1040 multiplies the conjugate of the frequency-domain channel estimate 735 with the inverse of the sum 1015.

While an example manner of implementing the example weight calculator 745 is illustrated in FIG. 10, the weight calculator 745 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 10 may be combined, re-arranged, eliminated and/or implemented in any of a variety of ways. For example, a single MAC circuit and/or unit could be used to implement the example adder 1020, the example magnitude computer 1010, the example inverter 1035, the example conjugator 1030 and/or the example multiplier 1040. Additionally, the example magnitude calculator 1010, the example adder 1020, the example conjugator 1030, the example inverter 1035, the example multiplier 1040 and/or the example weight calculator 745 may be implemented as any combination of firmware, software, logic and/or hardware. Moreover, the example weight calculator 745 may include additional processor(s), device(s), component(s), circuit(s), interface(s) and/or module(s) than those illustrated in FIG. 10 and/or may include more than one of any or all of the illustrated processor(s), device(s), component(s), circuit(s), interface(s) and/or module(s).

FIGS. 11, 12, 13, 14, and 15 are flowcharts representative of example machine accessible instructions that may be executed to implement the example equalizer and despreader 335, the example weight estimators 414, 416, the example channel estimators 705, 710, the example MAC units 725, 730, the example weight calculators 745, 750, the example data arranger 840 and/or, more generally, the example receiver 310 of FIGS. 3-9 and/or 10. The example machine accessible instructions of FIGS. 11-14 and/or 15 may be executed by a processor, a controller and/or any other suitable processing device. For example, the example machine accessible instructions of FIG. 11-14 and/or 15 may be embodied in coded instructions stored on a tangible medium such as a flash memory, read-only memory (ROM) and/or random-access memory (RAM) associated with a processor (e.g., the example processor 2710 discussed below in connection with FIG. 27). Alternatively, some or all of the example flowcharts of FIGS. 11-14 and/or 15 may be implemented using any of a variety of application specific integrated circuit(s) (ASIC(s)), programmable logic device(s) (PLD(s)), field programmable logic device(s) (FPLD(s)), discrete logic, hardware, firmware, etc. Also, some or all of the example flowcharts of FIGS. 11-14 and/or 15 may be implemented manually or as any combination(s) of any of the foregoing technique(s), for example, any combination of firmware, software, discrete logic and/or hardware. Further, although the example machine accessible instructions of FIGS. 11-15 are described with reference to the flowcharts of FIGS. 11-15 persons of ordinary skill in the art will readily appreciate that many other methods of implementing the example equalizer and despreader 335, the example weight estimators 414, 416, the example channel estimators 705, 710, the example MAC units 725, 730, the example weight calculators 745, 750, the example data arranger 840 and/or, more generally, the example receiver 310 of FIGS. 3-9 and/or 10 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 11-14 and/or 15 may be carried out sequentially and/or carried out in parallel by, for example, separate processing threads, processors, devices, discrete logic, circuits, etc.

FIG. 11 illustrates an example process that may be carried out to implement an equalizer and despreader (e.g., the example equalizer and despreader 335 of FIGS. 3 and/or 4). While the example process of FIG. 11 is described with reference to a single receive antenna, persons of ordinary skill in the art will readily recognize how to carry out the example process of FIG. 11 for two receive antennas.

The example machine accessible instructions of FIG. 11 begin with the equalizer and despreader setting a variable INDEX to zero (0) (block 1105). When an input sample (e.g., a sample of the input signal 401) is received (block 1107), the equalizer and despreader increments the value of INDEX (block 1110), and linearly upsamples an input sample (e.g., one of the example input samples 401, 402) by a factor of two (2) (block 1115).

If the value of INDEX modulo 8 is equal to zero (0) (block 1120), the equalizer and despreader stores the input sample in a data-path buffer (e.g., one of the example buffers 446, 448) (block 1125). If the value of INDEX modulo 8 is not equal to zero (0) (block 1120), control proceeds to block 1130 without storing the input sample in a data-path buffer.

Figure 13:
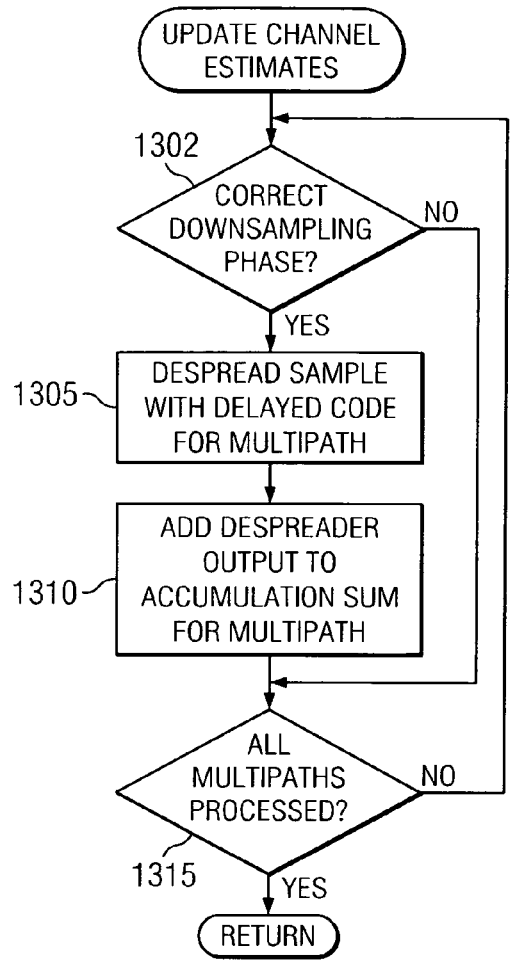

At block 1130, the equalizer and despreader updates multipath channel estimates based on the upsampled input sample by, for example, carrying out the example machine accessible instructions of FIG. 13.

If the value of the INDEX modulo 32*8 is not zero (block 1135), control returns to block 1107 to wait for the next input sample. If the value of the INDEX modulo 32*8 is zero indicating that 32 chips worth of input samples have been received (block 1135), the equalizer and despreader carries out the operation of a frequency-domain equalizer (e.g., the example FDE 440 of FIG. 4) by, for example, carrying out the example machine accessible instructions of FIG. 12 (block 1140).

If the value of the INDEX modulo 512*8 is not zero (block 1145), control returns to block 1107 to wait for the next input sample. If the value of the INDEX modulo 512*8 is zero indicating that 512 chips worth of input samples have been received and accumulated into multipath channel estimates (block 1145), the equalizer and despreader computes at least a partial Fourier transform of the multipath channel estimates by, for example, carrying out the example machine accessible instructions of FIG. 14 (block 1150). The equalizer and despreader then calculates a new set of equalizer weights (e.g., the example weight 420 of FIG. 4) by, for example, carrying out the example machine accessible instructions of FIGS. 15 and/or 19 (block 1155). Control then returns to block 1105 to set the value of INDEX to zero (0) (block 1105) and to wait for another input sample (block 1107).

For ease of explanation, the modulo 8 (block 1120), modulo 32*8 (block 1135) and modulo 512*8 (block 1145) boundaries illustrated in FIG. 11 are arbitrarily phase-aligned relative to an initial incoming sample. Persons of ordinary skill in the art will recognize that, in practice, such boundaries need to be properly chosen, updated, adapted and/or maintained. The control, choice, update, adaptation and/or maintenance of these boundaries can be performed using any of a variety of method(s), technique(s), logic and/or algorithm(s). Interested readers are referred to U.S. patent application Ser. No. 11/184,680 which is entitled "Frequency-domain Equalization" and which was filed Feb. 9, 2006 for further discussion on this point.

FIG. 12 illustrates an example process to equalize a block of stored data-path samples stored in a buffer (e.g., the example buffer 440 of FIG. 4). The example machine accessible instructions of FIG. 12 begin with a frequency-domain equalizer (e.g., the example FDE 440 of FIG. 4) computing a sixty-four (64)-pt FFT of the most recent 64 samples from the buffer (block 1205).

The frequency-domain equalizer equalizes FFT outputs with respective ones of the equalizer weights as described above in connection with FIGS. 5, 6A, 6B, 6C and/or below in connection with FIGS. 16A, 16B and/or 17 (block 1210). The frequency-domain equalizer computes a 64-pt IFFT of the equalized values (block 1215) and then discards the first and last 16 outputs of the IFFT (block 1220).

The 32 outputs of the IFFT that are retained (block 1220) are then despread (block 1225) and sent to an antenna combiner (e.g., the example antenna combiner 474 of FIGS. 4 and/or 16A. Control then returns from the example machine accessible instructions of FIG. 12 to, for example, block 1140 of the machine accessible instructions of FIG. 11.

FIG. 13 illustrates an example process to update fractional-spaced multipath channel estimates based on an oversampled received input sample (e.g., a sample of the example oversampled signal 403 of FIG. 4). The example process of FIG. 13 is carried out when an oversampled input sample is received (e.g., when called by the example process of FIG. 11 at block 1130)).

The example machine accessible instructions of FIG. 13 begin with determining if a current upsampled input sample represents the correct downsampling phase for a presently considered multipath (block 1302). If the current upsampled input sample represents the correct downsampling phase (block 1302), the input sample is despread based on a delayed despreading code for the presently consider multipath (block 1305). If not, control skips to block 1315 to determine if all multipaths have been processed.

Continuing at block 1310, the output of the despreading is added to the accumulated sum for the multipath (block 1310). If not all multipaths have been processed (block 1315), control returns to block 1305 to process the next multipath. If all multipaths have been processed (block 1315), control returns from the example machine accessible instructions of FIG. 13 to, for example, block 1130 of the example machine accessible instructions of FIG. 11.

Figure 14:
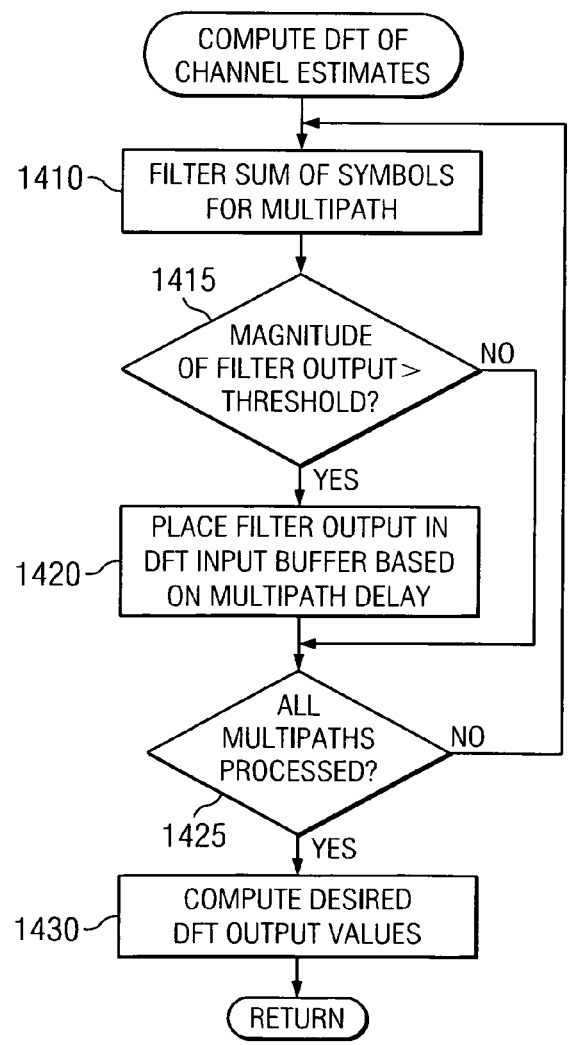

The example process of FIG. 14 computes the frequency-domain representation of multipath channel estimates. The example process of FIG. 14 is carried out whenever, for example, a block of oversampled input samples corresponding to 512 chips have been received (e.g., when called by the example process of FIG. 11 at block 1150).

The example machine accessible instructions of FIG. 14 begin by adding a multipath estimator (e.g., the example multipath estimator 801 of FIG. 8) filtering the accumulated sum (i.e., the example received despread pilot symbol 820) for a particular multipath (block 1410).

If the magnitude of the symbol for the presently considered multipath is greater than a threshold (block 1415), the value of the symbol (i.e., multipath channel estimate 820) is placed into a Fourier transform input array (e.g., the example inputs 715 of FIG. 7) based on the delay (e.g., the example multipath delay 814 of FIG. 8) associated with the multipath (block 1420). If the magnitude of the symbol is not greater than the threshold (block 1415), control proceeds to block 1425 without storing the symbol in the Fourier transform input array.

At block 1425, if all multipaths have not been processed (block 1425), control returns to block 1410 to process the next multipath. If all multipaths have been processed (block 1425), a MAC unit (e.g., the example MAC unit 725 of FIG. 7) computes at least a partial Fourier transform of the multipath channel estimates as described above in connection with FIGS. 7 and/or 9 (block 1430). Control then returns from the example machine accessible instructions of FIG. 14 to, for example, block 1150 of the example machine accessible instructions of FIG. 11.

The example process of FIG. 15 computes equalizer weights (e.g., the example weights 420 of FIG. 4) based upon frequency-domain representations of multipath channel estimates (e.g., the example Fourier transform outputs 735 of FIG. 7) by, for example, carrying out the example mathematical expression of EQN (2) and/or EQN (3). The example process of FIG. 15 is carried out when, for example, called by the example process of FIG. 11 at block 1155.

The example machine accessible instructions of FIG. 15 begin with a weight calculator (e.g., the example weight calculator 745 of FIGS. 7 and/or 10) computing the magnitude of a presently considered Fourier transform output (block 1505). The weight calculator computes a sum of the magnitude and an additive estimated noise variance (block 1510). If a transmit diversity configuration is being employed, the weight calculator also adds the magnitude of a Fourier transform output for a second transmit antenna to the sum at block 1510.

The weight calculator divides a complex conjugate of the presently consider transform output by the sum (block 1515). If all Fourier transform outputs have not been processed (block 1520), control returns to block 1505 to process the next transform output. If all Fourier transform outputs have been processed (block 1520), control exits from the example machine accessible instructions of FIG. 15 to, for example, block 1155 of the example machine accessible instructions of FIG. 11.

III. Frequency-domain Equalization for Large Delay-spread Channels

As discussed above in connection with FIG. 4, the example FDE 440 performs one or more Fourier transforms to transform one or more received signals 441, 442 into the frequency-domain where equalization is performed. Once equalization is performed, the equalized signal(s) are Fourier transformed back to the time-domain for subsequent processing such as despreading. The size of the Fourier transforms implemented by the example FDE 440 depends upon the range of supported multipath delays (i.e., delay-spread). For example, for a frequency-selective wireless channel, the size of the Fourier transforms needs to be larger than twice the delay-spread (in chips). For larger wireless cells and/or as the distance from a base station to a wireless device increases, the delay-spread also increases. However, as the delay-spread increases, the computational complexity of the FDE 440 also becomes increasing large since the size of the Fourier transform needs to correspondingly increase.

Example configurations of the example equalizer and despreader 335 of FIG. 4 for wireless channels that have large delay-spreads are illustrated in FIGS. 16A and 16B. The example configurations of FIGS. 16A and 16B perform equalization for large delay-spread channels without incurring additional implementation complexity for larger Fourier transforms. Recognizing that a large delay-spread channel may include a first set of multipaths delayed around a first delay value and a second set of multipaths delayed around a second delay value, the example configurations illustrated in FIGS. 16A and 16B utilize a split and/or dual frequency-domain equalizer structure. In the examples of FIGS. 16A and 16B, it is assumed that the first and the second set of multipaths are chosen so that the first delay value is smaller than the second delay value. Many of the element(s), device(s), module(s), circuit(s) and/or block(s) referenced in FIGS. 16A and 16B are identical to those discussed above in connection with FIGS. 4 and/or 5 and, thus, the description of identical element(s), device(s), module(s), circuit(s) and/or block(s) are not repeated here. Instead, identical element(s), device(s), module(s), circuit(s) and/or block(s) are illustrated with identical reference numerals in FIGS. 4, 5, 16A and 16B, and the interested reader is referred back to the descriptions presented above in connection with FIGS. 4 and/or 5 for a full discussion of those like numbered structures.

While for ease of illustration and discussion, example configurations employing a single receive antenna RX_ant0 are shown in FIGS. 16A and 16B, persons of ordinary skill in the art will readily appreciate that the example configurations illustrated in FIGS. 16A and 16B may be adapted to support two or more receive antennas.

Turning to FIG. 16A in more detail, a first set of channel estimates and equalizer weights 1605 are determined for the first set of multipaths, and a second set of channel estimates and equalizer weights 1610 are determined for the second set of multipaths. Methods and apparatus for determining the channel estimates and equalizer weights 1605, 1610 are discussed above in connection with FIGS. 5-15. Because within each set of multipaths the delay-spread is small, reasonable size Fourier transforms (e.g., 64-pt) can be implemented by the Fourier transformers 450, 456 and 458. In the illustrated example of FIG. 16A, the downsampled data-path samples 441 are transformed to the frequency-domain via a single Fourier transformer 450.

To equalize the frequency-domain representation 1615 of the data-path samples 441, the example MIMO core 454 is configured to equalize the frequency-domain signal 1615 with the equalizer coefficients 1605 for the first set of multipaths to form a first equalized signal 1620, and the example MIMO core 455 is configured to equalize the frequency domain signal 1615 with equalizer coefficients 1610 for the second set of multipaths to form a second equalized signal 1625, as illustrated in FIG. 16A. The equalized signals 1620 and 1625 are subsequently inverse Fourier transformed to the time-domain, buffered and despread as described above in connection with FIG. 4 to form time-domain signals 1630 and 1635, respectively.

To combine the despread time-domain equalized signals 1630 and 1635 to from a total received signal, the example equalizer and despreader 335 of FIG. 16A includes an antenna combiner 474 constructed in accordance with the teachings of the invention. To delay the equalized symbol 1630 so that it is time-aligned with the equalized symbol 1635, the example antenna combiner 474 of FIG. 16A includes any of a variety of delays 1640. The example delay 1640 of FIG. 16A delays the equalized symbol 1630 by an amount substantially equal to the nearest integer that is less than the difference between the first delay associated with the first set of multipaths and the second delay associated with the second set of multipaths D divided by the length F of the code sequence used to despread the equalized signals 1620 and 1625 (i.e., floor(D/F) ). The example delay 1640 of FIG. 16A may be implemented using any variety and/or size of memory (-ies) and/or registers. While the example delay 1640 is illustrated in FIG. 16A as being part of the example antenna combiner 474 and/or, more generally, a part of the example equalizer and despreader 335 of FIG. 16A, the delay 1640 may be implemented separately from, and/or communicatively and/or electrically coupled to the antenna combiner 474 and/or the equalizer and despreader 335. Moreover, the delay 1640 may be implemented by the buffer 462. In this case, the amount of delay required is D chips.

To combine the delayed equalized symbol 1630 and the equalized symbol 1635, the example antenna combiner 474 of FIG. 16A includes any of a variety of adders 1645. The example adder 1645 of FIG. 16A adds together corresponding delayed equalized symbols 1630 and equalized symbols 1635.

FIG. 16B illustrates an alternative equalizer and despreader 335 for wireless channels with large delay-spread. Because many of the element(s), device(s), module(s), circuit(s) and/or block(s) referenced in FIG. 16B are identical to those discussed above in connection with FIGS. 4, 5 and/or 16A the description of identical element(s), device(s), module(s), circuit(s) and/or block(s) are not repeated here. Instead, identical element(s), device(s), module(s), circuit(s) and/or block(s) are illustrated with identical reference numerals in FIGS. 4, 5, 16A and 16B, and the interested reader is referred back to the descriptions presented above in connection with FIGS. 4, 5 and/or 16A for a full discussion of those like numbered structures.

Like the example equalizer and despreader 335 of FIG. 16A, the example equalizer and despreader 335 of FIG. 16B equalizes the frequency-domain signal 1615 with the equalizer coefficients 1605 for the first set of multipaths to form a first equalized signal 1620, and with equalizer coefficients 1610 for the second set of multipaths to form a second equalized signal 1625. However, in contrast to the illustrated example of FIG. 16A, the example equalizer and despreader 335 of FIG. 16B combines the equalized signals 1620 and 1625 before despreading.

To delay the equalized signal 1620 so that it is time-aligned with the equalized signal 1625, the example equalizer and despreader 335 of FIG. 16B utilizes the example buffer 462 to delay a time-domain representation 1650 of the equalized signal 1620. In the example of FIG. 16, the example delay 462 delays the signal 1650 by an amount substantially equal to the nearest integer less than the difference between the first delay associated with the first set of multipaths and the second delay associated with the second set of multipaths D.

To add the delayed equalized signal 1650 and a time-domain representation 1655 of the equalized signal 1625, the example equalizer and despreader 335 of FIG. 16B includes any of a variety of adders 1660. The example adder 1660 of FIG. 16B adds together corresponding samples of the delay equalized signal 1650 and the equalized signal 1655. As illustrated in FIG. 16B, the output 1665 of the example adder 1660 is subsequently despread by the despreader 464.

While an example manner of implementing the example equalizer and despreaders 335 are illustrated in FIGS. 16A and 16B, the equalizer and despreaders 335 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIGS. 16A and/or 16B may be combined, re-arranged, eliminated and/or implemented in any of a variety of ways. Additionally, the example weight estimators 414, the example FDE 440, the example downsampler 442, the example Fourier transformer 450, 456, 458, the example buffers 446, 462, 463, the example MIMO core 454, the example despreaders 464, 466, the example OSVF code generator 468, the example antenna combiner 474, the example delay 1640 and/or the example equalizer and despreader 335 may be implemented as any combination of firmware, software, logic and/or hardware. Moreover, the example equalizer and despreaders 335 may include additional processor(s), device(s), component(s), circuit(s), interface(s) and/or module(s) than those illustrated in FIGS. 16A and/or 16B and/or may include more than one of any or all of the illustrated processor(s), device(s), component(s), circuit(s), interface(s) and/or module(s).

FIG. 17 is a flowchart representative of example machine accessible instructions that may be executed to implement the example equalizer and despreader 335 of FIG. 16B. Persons of ordinary skill in the art will readily recognize that the example flowchart of FIG. 17 may be readily modified to implement the example equalizer and despreader 336 of FIG. 16A. The example machine accessible instructions of FIG. 17 may be executed by a processor, a controller and/or any other suitable processing device. For example, the example machine accessible instructions of FIG. 17 may be embodied in coded instructions stored on a tangible medium such as a flash memory, ROM and/or RAM associated with a processor (e.g., the example processor 2710 discussed below in connection with FIG. 27). Alternatively, some or all of the example flowchart of FIG. 17 may be implemented using any of a variety of ASIC(s), PLD(s), FPLD(s), discrete logic, hardware, firmware, etc. Also, some or all of the example flowchart of FIG. 17 may be implemented manually or as any combination(s) of any of the foregoing technique(s), for example, any combination of firmware, software, discrete logic and/or hardware. Further, although the example machine accessible instructions of FIG. 17 are described with reference to the flowchart of FIG. 17 persons of ordinary skill in the art will readily appreciate that many other methods of implementing the example equalizer and despreader 335 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 17 may be carried out sequentially and/or carried out in parallel by, for example, separate processing threads, processors, devices, discrete logic, circuits, etc.

FIG. 17 illustrates an example process to equalize a block of stored data-path samples stored in a buffer (e.g., the example buffer 440 of FIG. 4). The example machine accessible instructions of FIG. 17 begin with a frequency-domain equalizer (e.g., the example FDE 440 of FIG. 16B) computing a sixty-four (64)-pt FFT of the most recent 64 samples from the buffer (block 1705).

The frequency-domain equalizer equalizes FFT outputs a first set of equalizer weights that correspond to a first set of multipaths (e.g., the example equalizer weights 1605 of FIG. 16B) (block 1710). The frequency-domain equalizer computes a 64-pt IFFT of this first set of equalized values (block 1715), discards the first and last 16 outputs of the IFFT (block 1720) and then delays the first set of equalized values by an amount substantially equal to the nearest integer less than the difference between the first delay associated with the first set of multipaths and the second delay associated with the second set of multipaths D (block 1725).

The frequency-domain equalizer equalizes the FFT outputs with a second set of equalizer weights that correspond to the second set of multipaths (e.g., the example equalizer weights 1610 of FIG. 16B) (block 1730). The frequency-domain equalizer computes a 64-pt IFFT of this second set of equalized values (block 1735), and then discards the first and last 16 outputs of the IFFT (block 1740).

An equalizer and despreader (e.g., the example equalizer and despreader 335 of FIG. 16B) then adds together the delayed first set of equalized values and the second set of equalized values (block 1745). The equalizer and despreader then despreads outputs of the equalizer (block 1750) and sends the despread values to an antenna combiner (e.g., the example antenna combiner 474 of FIG. 16B) (block 1755).

Control then returns from the example machine accessible instructions of FIG. 17 to, for example, block 1140 of the machine accessible instructions of FIG. 11.

IV. Frequency-domain Equalization for Closed-loop Transmit Diversity

When a wireless signal is transmitted by a base station (e.g., the example base station 110 of FIG. 1) using closed-loop transmit diversity (e.g., sent using two transmit antennas TX_ant0 and TX_ant1 with different spreading codes), the transmitted signals may not be completely orthogonal. That is, they may have a cross-correlation that is non-zero. As such, when they are subsequently received at a wireless receiver (e.g., the example receiver 310 of FIG. 3), they can cause and/or represent interference to each other. In particular, the auto-covariance matrix of the received signal includes one or more cross-correlation terms as illustrated in the mathematical expression of EQN (4).

$$R = E\{yy^H\} \\ = \sigma_s^2 H_1 H_1^H + \sigma_s^2 H_2 H_2^H + H_1 E\{x_1 x_2^H\} H_2^H + \\ H_2 E\{x_2 x_1^H\} H_1^H + \sigma_n^2 I,$$ EQN (4)

where y is the received signal, E{ } is the expected value operator, ( )$^H$ is the Hermetian operator, $\sigma_s^2$ is the transmit power, $\sigma_n^2$ is the estimated variance of additive noise, $H_1$ and $H_2$ are matrices that represent the wireless channel estimates from TX_ant0 and TX_ant1 to the receive antenna, respectively, I is an identity matrix, $x_1$ and $X_2$ are the transmitted signals, and the terms $E\{x_1 x_2^H\}$ and $E\{x_2 x_1^H\}$ represent the cross-correlation between the transmit signals $x_1$ and $X_2$.

Figure 18:
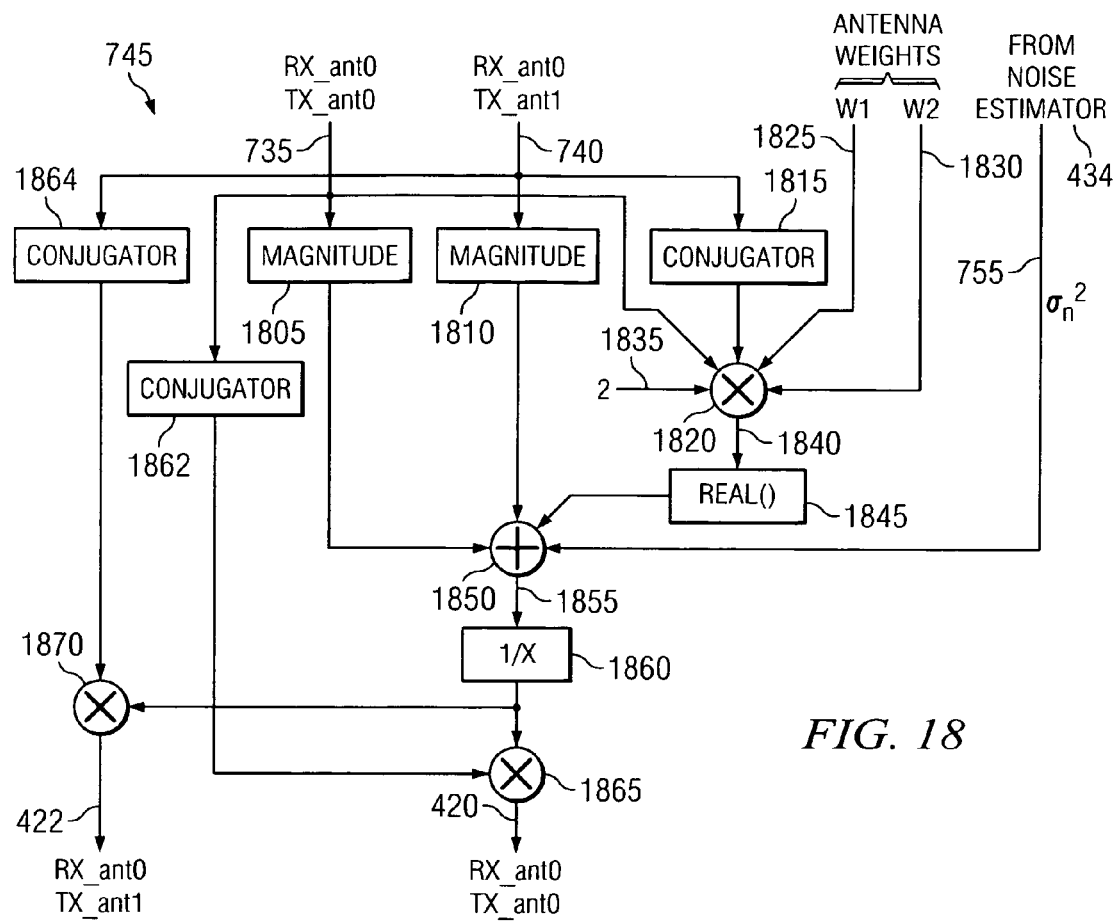
FIG. 18 illustrates an example manner of implementing the example weight calculator of FIG. 4 to support closed-loop transmit diversity.

FIG. 18 illustrates an example manner of collectively implementing either or both of the example weight calculators 745 and 750 of FIG. 7. While either or both of the example weight calculators 745, 750 may be represented by FIG. 18, for ease of discussion the example device of FIG. 18 will be referred to as weight calculator 745. The example weight calculator 745 of FIG. 18 calculates equalizer weights 420 and 422 based on the frequency-domain channel estimates 735 and 740 for signals transmitted via TX_ant0 and received via RX_ant0 and TX_ant0 and received via RX_ant0, respectively, and that include, represent and/or factor-in the cross-correlation between the transmit signals $x_1$ and $X_2$.

In more detail, the example weight calculator 745 of FIG. 18 calculates the cross-correlation terms illustrated in the mathematical expression of EQN (5).

$$E\{x_1 x_2^H\} = E\{(v_1 + w_1 x^H)(v_2 + w_2 x^H)\} \\ = E\{v_1 v_2^H\} + w_1 w_2^* \sigma_x^2,$$ EQN (5)

where $v_1$ and $v_2$ represent signals transmitted to other users, $w_1$ and $w_2$ represent the antenna weights for the desired user's signals being received, $\sigma_s^2$ represents the transmit power for the desired user, $x_1 = v_1 + w_1 x$, $x_2 = v_2 + w_2 x$, and x represents the transmitted signal. When HSDPA signal loading is high (e.g., when signals are being transmitted to a large number of users), the term $E\{v_1 v_2^H\}$ can be reasonably assumed to be zero (0) and, thus, the cross-correlation terms of EQN (5) can be calculated using the following mathematical expression $$E\{xx^H\} = w_1 w_2^* \sigma_x^2.$$ EQN (6)

Substituting the mathematical expression of EQN (6) into EQN (4) and assuming that $\sigma_x^2 = \sigma_s^2$ the following mathematical approximation of the auto-covariance matrix can be obtained $$R = \sigma_s^2 H_1 H_1^H + \sigma_s^2 H_2 H_2^H + 2\sigma_s^2 Re(w_1 w_2^* H_1 H_2^H) + \\ \sigma_n^2 I.$$ EQN (7)

The example weight calculator 745 of FIG. 10 assumes that the third (3rd) term of EQN (7) is zero, that is, if transmit diversity was utilized that the transmit signals were orthogonal. In contrast, the example weight calculator 745 of FIG. 18 incorporates and/or includes the third (3$^{rd}$) term when calculating the equalizer weights 420 and 422. In general, the equalizer weights 420 and 422 of FIG. 18 are the frequency-domain channel responses 735 and 740, respectively, divided by the value of the example mathematical expression of EQN (7).

While the example mathematical expression illustrated in EQN (7) is expressed with respect to channel estimate matrices $H_1$ and $H_2$, persons of ordinary skill in the art will readily recognize that EQN (7) can be used to compute the frequency-domain equalizer weights 420, 422 by substituting frequency-domain representations of multipath channel responses (i.e., the frequency-domain values 735 and 740) for the channel matrix values. As such, EQN (7) and/or, more generally, the example weight calculator 745 of FIG. 18 is carried out for each frequency of interest.

To compute the magnitudes of the frequency-domain channel responses 735, 740 at a presently considered frequency of interest for TX_ant0 and TX_ant1, the example weight calculator 745 of FIG. 18 includes any of a variety of magnitude calculators 1805 and 1810. Using any of a variety of method(s), technique(s), circuit and/or logic, the example magnitude calculators 1805 and 1810 of FIG. 18 compute the squared magnitudes of the frequency-domain channel responses 735 and 740, respectively.

To compute the conjugate of the frequency-domain channel response 740, the example weight calculator 745 of FIG. 18 includes any of a variety of conjugator 1815. The example conjugator 1815 of FIG. 18 computes the complex conjugate of the frequency-domain channel response 740.

To compute the third (3$^{rd}$) term of EQN (7), the example weight calculator 745 of FIG. 18 includes any of a variety of multipliers 1820. The multiplier 1820 of FIG. 18 performs a complex multiplication of the frequency-domain channel response 735, the conjugate of the frequency-domain channel response 740, the antenna weight w1 1825, the antenna weight w2 1830 and a constant 1835 that has a value of two (2).

To compute the real part of the complex output 1840 of the multiplier 1820, the example weight calculator 745 of FIG. 18 includes any of a variety of real operators 1845. The example real operator 1845 of FIG. 18 discards the imaginary part of the complex value 1840.

To add together the terms of EQN (7), the example weight calculator 745 of FIG. 18 includes any of a variety of adders 1850. The example adder 1850 of FIG. 18 sums (a) the magnitude of the frequency-domain channel response 735 and

740, (b) the output of the real operator 1845, and (c) an estimate 755 of the variance of the additive noise.

To compute the inverse of the output 1855 of the adder 1850, the example equalizer 745 of FIG. 18 includes any of a variety of inverter 1860.

To compute conjugates of the frequency-domain channel responses 735 and 740, the example weight calculator 745 of FIG. 18 includes any of a variety of conjugators 1862 and 1864. The example conjugators 1862 and 1864 of FIG. 18 compute the complex conjugates of the frequency-domain channel responses 735 and 740, respectively. Persons of ordinary skill in the art will readily appreciate that the example conjugator 1815 may be used to implement the example conjugator 1864, or vice versa. That is, the conjugate of the frequency-domain channel response 740 may be computed once and then used by both of the multipliers 1820 and 1870.

To compute the equalizer weights 420 and 422, the example weight calculator 745 of FIG. 18 includes any of a variety of multipliers 1865 and 1870. The example multipliers 1865 and 1870 multiply the conjugates of the frequency-domain channel responses 735 and 740, respectively, by the output of the inverter 1860 (i.e., the value of the example expression of EQN (7)).

While an example manner of implementing the example weight calculator 745 is illustrated in FIG. 18, the weight calculator 745 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 18 may be combined, re-arranged, eliminated and/or implemented in any of a variety of ways. For example, a single MAC circuit and/or unit could be used to implement the example magnitude calculators 1805, 1810, the example conjugators 1815, 1862, 1864, the example adder 1820, the example real operator 1845, the example adder 1850, the example inverter 1860 and/or the example multipliers 1870, 1875. Additionally, the example magnitude calculators 1805, 1810, the example conjugator 1815, the example multipliers 1820, 1870, the example real operator 1845, the example adder 1850 and/or the weight calculator 745 may be implemented as any combination of firmware, software, logic and/or hardware. Moreover, the weight calculator 745 may include additional processor(s), device(s), component(s), circuit(s), interface(s) and/or module(s) than those illustrated in FIG. 18 and/or may include more than one of any or all of the illustrated processor(s), device(s), component(s), circuit(s), interface(s) and/or module(s).

Figure 19:
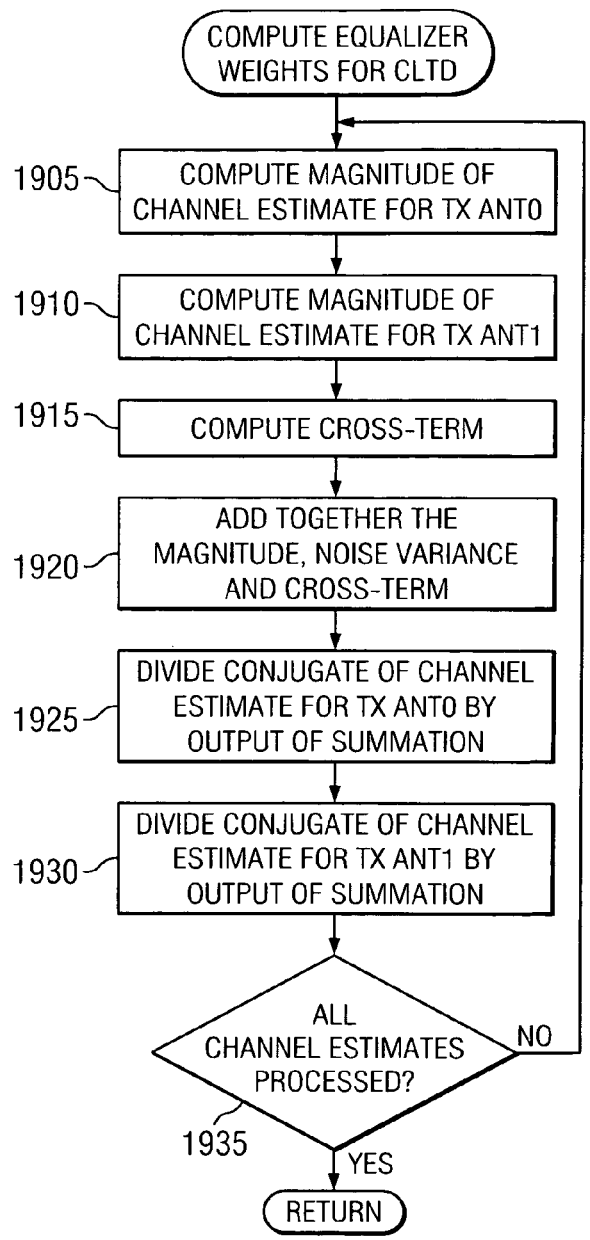
FIG. 19 is a flowchart representative of example machine readable instructions which may be executed to implement the example weight calculator of FIG. 18.

FIG. 19 is a flowchart representative of example machine accessible instructions that may be executed to implement the example weight calculator 745 of FIG. 18. The example machine accessible instructions of FIG. 19 may be executed by a processor, a controller and/or any other suitable processing device. For example, the example machine accessible instructions of FIG. 19 may be embodied in coded instructions stored on a tangible medium such as a flash memory, ROM and/or RAM associated with a processor (e.g., the example processor 2710 discussed below in connection with FIG. 27). Alternatively, some or all of the example flowchart of FIG. 19 may be implemented using any of a variety of ASIC(s), PLD(s), FPLD(s), discrete logic, hardware, firmware, etc. Also, some or all of the example flowchart of FIG. 19 may be implemented manually or as any combination(s) of any of the foregoing technique(s), for example, any combination of firmware, software, discrete logic and/or hardware. Further, although the example machine accessible instructions of FIG. 19 are described with reference to the flowchart of FIG. 19 persons of ordinary skill in the art will readily appreciate that many other methods of implementing the example weight calculator 745 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIG. 19 may be carried out sequentially and/or carried out in parallel by, for example, separate processing threads, processors, devices, discrete logic, circuits, etc.

The example machine accessible instructions of FIG. 19 being with a weight calculator (e.g., the example weight calculator 745 of FIG. 19) computing the magnitude of a presently consider frequency-domain channel response for TX_ant0 (e.g., the channel response 735 of FIG. 18) (block 1905) and the magnitude of a presently consider frequency-domain channel response for TX_ant1 (e.g., the channel response 740 of FIG. 18) (block 1910).

The weight calculator computes the cross-correlation term by computing a product of the frequency-domain channel response for TX_ant0, a conjugate of the frequency-domain channel response for TX_ant1, the antenna weights $w_1$ and $w_2$ and a constant that has a value of two (2) (block 1915).

The weight calculator then computes a sum of the cross-correlation term computed at block 1915, the magnitudes of the frequency-domain channel responses and an estimate of the variance of the additive noise (block 1920).

The weight calculator next computes the equalizer coefficient for TX_ant0 by dividing its frequency-domain channel response by the sum calculated at block 1920 (block 1925) and then it computes the equalizer coefficient for TX_ant1 by dividing its frequency-domain channel response by the sum calculated at block 1920 (block 1930).

If not all frequencies of interest have been processed (block 1935), control returns to block 1905 to process the next frequency of interest. If all frequencies of interest have been processed (block 1935), control returns from the example machine accessible instructions of FIG. 19 to, for example, block 1155 of the example machine accessible instructions of FIG. 11.

V. Noise Estimation

Figure 20:
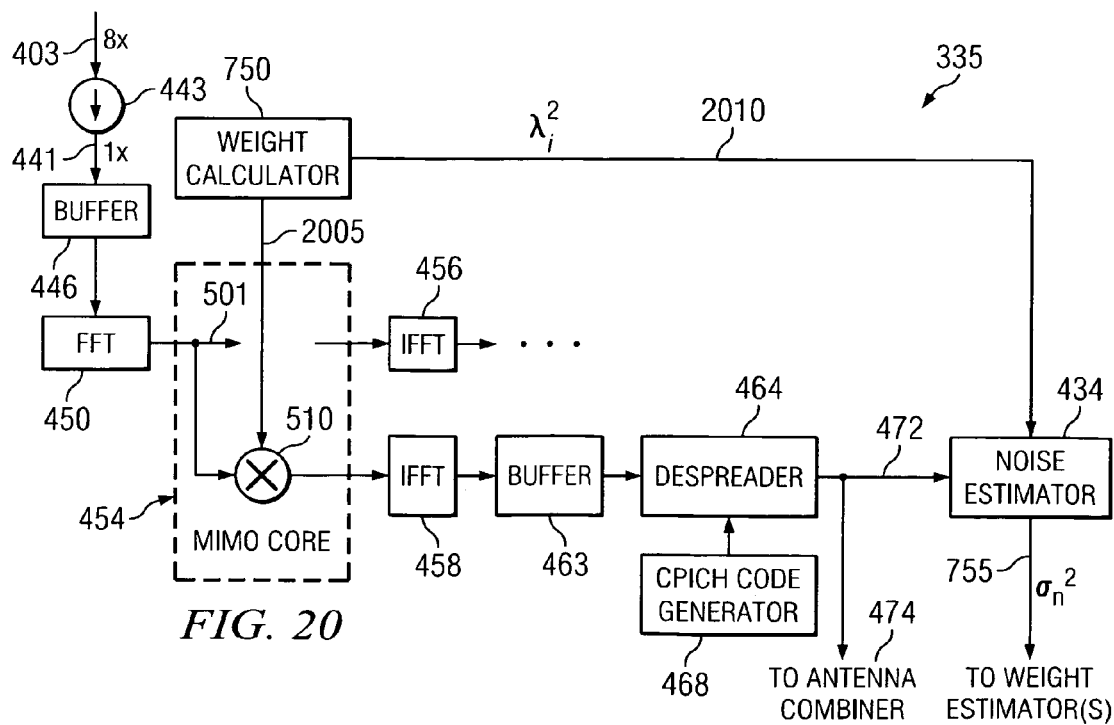
FIG. 20 illustrates an example configuration of the example equalizer and despreader of FIG. 4 to perform noise estimation.

FIG. 20 illustrates an example configuration of the example equalizer and despreader 335 of FIG. 4 to perform noise estimation in accordance with a teaching of the invention. When a received CDMA signal is despread for a particular multipath, interference and/or multipaths that have different delays introduce and/or cause noise at the output of the despreader, in addition to the simple additive noise caused by the transmission via a wireless channel. Accordingly, the example MIMO core 454 of FIG. 20 is configured to, among other things, apply coefficient weights 2005 for a zero-forcing filter to the frequency-domain representation of the received signal 441 to remove and/or reduce multipath interference. Because the multipath interference has been removed and/or reduced, an output of the zero-forcing filter can be despread for the CPICH channel. The received CPICH symbols may then be used as illustrated in FIG. 20 to estimate the power and/or variance $\sigma_n^2$ 755 of the additive noise.

Many of the element(s), device(s), module(s), circuit(s) and/or block(s) referenced in FIG. 20 are identical to those discussed above in connection with FIGS. 4, 5 and/or 7 and, thus, the description of identical element(s), device(s), module(s), circuit(s) and/or block(s) are not repeated here. Instead, identical element(s), device(s), module(s), circuit(s) and/or block(s) are illustrated with identical reference numerals in FIGS. 4, 5, 7, and 20, and the interested reader is referred back to the descriptions presented above in connection with FIGS. 4, 5 and/or 7 for a full discussion of those like numbered structures. Moreover, while for ease of explanation, the example of FIG. 20 is illustrated relative to a single receive antenna, persons of ordinary skill in the art will readily recognize that the methods and apparatus illustrated in FIG. 20 may be utilized for more than one receive antenna.

In the illustrated example of FIG. 20, the received data-path signal 441 is Fourier transformed to form the frequency-domain received data-path signal 501. To apply a zero-forcing filter, the example MIMO core 454 of FIG. 20 and/or, more particularly, the example multiplier 510 is configured to multiply the frequency-domain signal 501 with zero-forcing filter coefficients 2005. The example Fourier transformer 458, the buffer 462 and the despreader 464 of FIG. 20 then operate to extract CPICH symbols and the additive noise from the output of the zero-forcing filter implemented by the example multiplier 510. In the example of FIG. 20, the output 472 of the example despreader 464 may, additionally or alternatively, be used to receive symbols transmitted by transmit antenna TX_ant1.

As discussed above in connection with FIGS. 5, 6A-6C, the example MIMO core 454 of FIG. 20 may, additionally or alternatively, be configured to apply one or more additional sets of equalizer weights. For example, as illustrated in FIG. 20, the MIMO core 454, the example Fourier transformer 456 and subsequent processing blocks (not shown) may be used to receive symbols transmitted by transmit antenna TX_ant0.

To compute the zero-forcing equalizer weights 2005, the example equalizer and despreader 335 of FIG. 20 includes the example weight calculator 750. The weight calculator 750 of FIG. 20 is substantially similar to the example weight calculator 745 discussed above in connection with FIG. 10. However, in contrast to the example weight calculator of FIG. 10, the example weight calculator 750 of FIG. 20 does not include the noise estimate $\sigma_n^2$ 755 in the sum computed by the example adder 1020.

The example noise estimator 434 of FIG. 20 estimates the variance of the additive noise $\sigma_n^2$ 755 from the CPICH symbols 472. In particular, the example noise estimator 434 computes the variance of the CPICH symbols 472 using, for example, the mathematical expression of EQN (8).

$$\sigma_{ZF}^2 = N\sigma_n^2 \Sigma |w_i|^2, \qquad \text{EQN (8)}$$

where $w_1$ are the zero-forcing filter coefficients and N is size of the Fourier transform (e.g., 64). In the example of FIG. 20, the zero-forcing filter is implemented in the frequency-domain using equalizer weights 2005 that are the frequency-domain channel estimates 740 of the channel responses 720 divided by sum of the magnitude of the frequency-domain estimates 735 and 740, as discussed above in connection with FIG. 10. Accordingly, the zero-forcing equalizer weights $w_i$ of EQN (8) can be expressed mathematically as $$w = \frac{1}{\sqrt{K}} F^H \begin{bmatrix} 1/\lambda_1^* \\ \vdots \\ 1/\lambda_K^* \end{bmatrix}, \qquad \text{EQN (9)}$$

where w is a vector of the equalizer weights $w_i$, $\lambda_i$ is the $i^{th}$ element of the frequency-domain channel responses 740, and F represents the Fourier transform matrix. Substituting EQN (9) into EQN (8) and solving for the variance $\sigma_n^2$ 755 of the additive noise results in the following mathematical expression:

$$\sigma_n^2 = \frac{K\sigma_{ZF}^2}{N \sum_{i=1}^{K} |1/\lambda_i^2|} \qquad \text{EQN (10)}$$

Based on the computed CPICH symbol variance and the frequency-domain channel responses 740, the example noise estimator 434 of FIG. 20 estimates the variance $\sigma_n^2$ 755 of the additive noise by, for example, carrying out the mathematical expression of EQN (10). In the example of FIG. 20, the weight calculator 750 computes and provides the magnitude 2010 of each of the frequency-domain channel responses 740 (i.e., each value of $\lambda_i^2$) to the example noise estimator 434.

Figure 21:
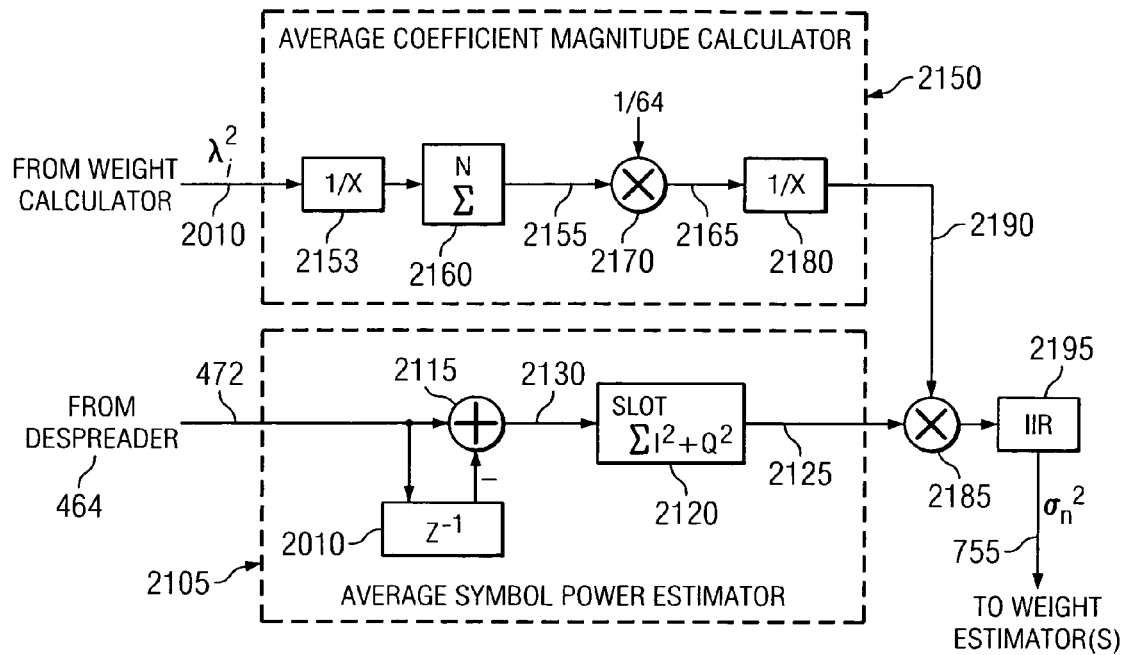
FIG. 21 illustrates an example manner of implementing the example noise estimator of FIG. 20.

FIG. 21 illustrates an example manner of implementing the example noise estimator 454 of FIG. 20 and/or the example mathematical expression illustrated in EQN (10). To calculate the average symbol power, the example noise estimator 434 of FIG. 21 includes an average symbol power estimator 2105. The average symbol power estimator 2105 of FIG. 21 computes the average of received symbols over each time slot and/or over a set of received symbols (e.g., the numerator of the example mathematical expression of EQN (10)).

To remove any correlation between symbols, the example average symbol power estimator 2105 of FIG. 21 includes any of a variety of delays 2110 and any of a variety of adders 2115. The example delay 2110 of FIG. 21 delays the symbol 472 by the duration of one symbol and the example adder subtracts the delayed symbol 472 (i.e., the previous symbol) from the current symbol 472.

To compute the power of a set of symbols, the example average symbol power estimator 2105 includes any of a variety of summers 2120. The example summer 2120 of FIG. 21 computes a sum 2125 of the squared magnitude of the complex symbols 2130.

To compute the average magnitude of the coefficients (e.g., the denominator of the example mathematical expression of EQN (10)), the example noise estimator 434 of FIG. 21 includes an average coefficient magnitude calculator 2150. To compute an inverse of the coefficient magnitudes 2010, the example average coefficient magnitude calculator 2150 of FIG. 21 includes any of a variety of inverters 2153. The example inverter 2153 of FIG. 21 computes an inverse of the coefficient magnitudes 2010.

To compute a sum 2155 of the inverted coefficient magnitudes 2010, the example average coefficient magnitude calculator 2150 of FIG. 21 includes any of a variety of summers 2160. The example summer 2160 of FIG. 21 computes the cumulative sum 2155 of a set of inverted coefficient magnitudes 2010.

To compute the average 2165 of the cumulative sum 2155, the average coefficient magnitude calculator 2150 of FIG. 21 includes any of a variety of multipliers 2170. The example multiplier 2170 of FIG. 21 divides the cumulative sum 2155 by the product of (a) the number coefficients (i.e., the size N of the Fourier transform implemented by the example Fourier transformer 450 of FIG. 20 (e.g., N=64)) and (b) the number of times T the weights 2010 are updated per time slot (e.g., N*T).

To compute the inverse of the average coefficient magnitude, the example average coefficient magnitude calculator 2150 of FIG. 21 includes any of a variety of inverter 2180.

To compute an estimate of the variance $\sigma_n^2$ 755 of the additive noise, the example noise estimator 434 of FIG. 21 includes any of a variety of multipliers 2185. The example multiplier 2185 of FIG. 21 multiplies the average symbol power 2125 and the inverse of the average coefficient magnitude 2190.

To reduce out-of-band noise and to help smooth the noise estimate $\sigma_n^2$ 755, the example noise estimator 434 of FIG. 21 includes a filter 2195. The example filter 2195 of FIG. 21 is a one-pole IIR filter that provides a LPF transfer function. It should be readily apparent to persons of ordinary skill in the art that the filter 2195 could utilize FIR filters and/or any other suitable filter structure(s) or filtering arrangement(s).

While an example manner of implementing the example noise estimator 434 is illustrated in FIG. 21, the noise estimator 434 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 21 may be combined, re-arranged, eliminated and/or implemented in any of a variety of ways. For example, a single MAC circuit and/or unit could be used to implement the example delay 2110, the example adder 2115, the example summers 2120, 2160, the example multiplier 2170, the example inverters 2153, 2180, the example multiplier 2185 and/or the example filter 2195. Additionally, the example delay 2110, the example adder 2115, the example summers 2120, 2160, the example multipliers 2170, 2185, the example inverter 2180, the example filter 2195 and/or the noise estimator 434 may be implemented as any combination of firmware, software, logic and/or hardware. Moreover, the noise estimator 434 may include additional processor(s), device(s), component(s), circuit(s), interface(s) and/or module(s) than those illustrated in FIG. 21 and/or may include more than one of any or all of the illustrated processor(s), device(s), component(s), circuit(s), interface(s) and/or module(s).

Figure 22:
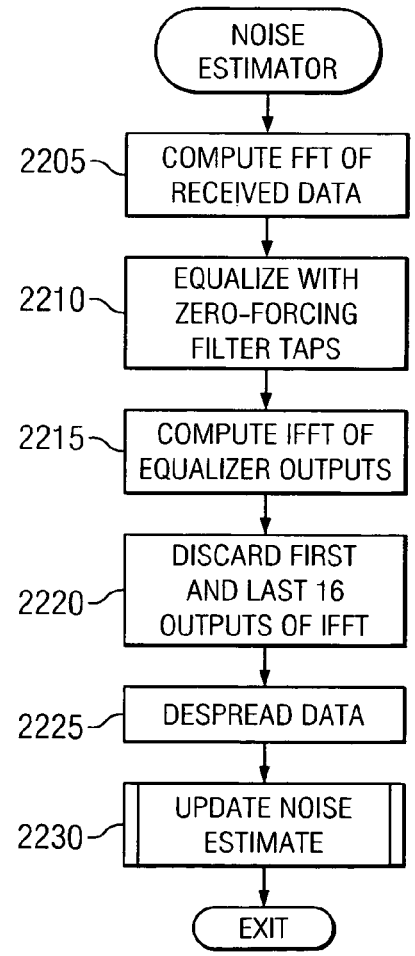
FIGS. 22 and 23 are flowcharts representative of example machine readable instructions which may be executed to implement the example noise estimator of FIGS. 20 and 21.
Figure 23:
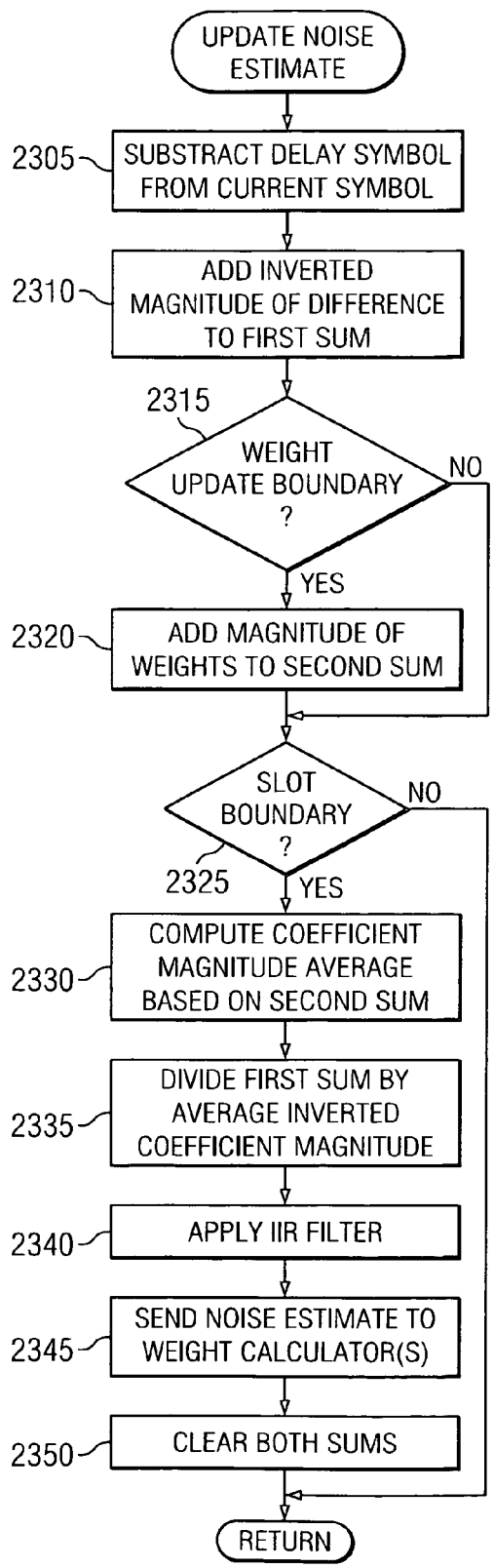

FIGS. 22 and 23 are flowcharts representative of example machine accessible instructions that may be executed to implement the example noise estimator 434 and/or, more generally, the example equalizer and despreader 335 of FIG. 21. The example machine accessible instructions of FIGS. 22 and/or 23 may be executed by a processor, a controller and/or any other suitable processing device. For example, the example machine accessible instructions of FIGS. 22 and/or 23 may be embodied in coded instructions stored on a tangible medium such as a flash memory, ROM and/or RAM associated with a processor (e.g., the example processor 2710 discussed below in connection with FIG. 27). Alternatively, some or all of the example flowcharts of FIGS. 22 and/or 23 may be implemented using any of a variety of ASIC(s), PLD(s), FPLD(s), discrete logic, hardware, firmware, etc. Also, some or all of the example flowcharts of FIGS. 22 and/or 23 may be implemented manually or as any combination(s) of any of the foregoing technique(s), for example, any combination of firmware, software, discrete logic and/or hardware. Further, although the example machine accessible instructions of FIGS. 22 and 23 are described with reference to the flowcharts of FIGS. 22 and 23 persons of ordinary skill in the art will readily appreciate that many other methods of implementing the example noise estimator 434 and/or, more generally, the example equalizer and despreader 335 of FIG. 21 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 22 and/or 23 may be carried out sequentially and/or carried out in parallel by, for example, separate processing threads, processors, devices, discrete logic, circuits, etc.

The example machine accessible instructions of FIG. 22 begin when a new set of data-path samples are received (e.g., 32 samples of the received signal 441). An equalizer and despreader (e.g., the example equalizer and despreader 335 of FIG. 20) computes a Fourier transform of the most recent sixty-four (64) samples (block 2205).

The equalizer and despreader equalizes the output of the Fourier transform with coefficients of a zero-forcing filter (block 2210) and computes an inverse Fourier transform of the equalized samples (block 2215). The equalizer and despreader then discards the first and last 16 samples of the inverse Fourier transform outputs (block 2220) and despreads the remaining 32 samples (block 2225). The equalizer and despreader then updates the noise estimate (e.g., the example noise estimate 755 of FIG. 21) (block 2230) by, for example, carrying out the example machine accessible instructions of FIG. 23. Control then returns from the example machine accessible instructions of FIG. 22.

The example machine accessible instructions of FIG. 23 begin when a new received symbol is received (e.g., when called by the example machine accessible instructions of FIG. 22). A noise estimator (e.g., the example noise estimator 434 of FIG. 21) subtracts a previous symbol from the new symbol to compute a difference (block 2305) and then adds the magnitude of that difference to a first sum (block 2310).

If an equalizer weight has occurred (e.g., the calculations of the weight calculators 745, 750 have been carried out) (block 2315), the noise estimator adds the inverted magnitude of each new equalizer weight to a second sum (block 2320). If an equalizer weight calculation has not occurred (block 2315), control proceeds to block 2325 without updating the second sum.

If a predetermined number of symbols have not been received (i.e., a time slot has elapsed) (block 2325), control returns from the example machine accessible instructions of FIG. 23 to, for example, block 2230 of the example machine accessible instructions of FIG. 22.

When the predetermined number of symbols have been received (i.e., a time slot has elapsed) (block 2325), the noise estimator computes the average of the $2^{nd}$ sum (i.e., the average magnitude of the coefficients) (block 2330) and divides the value of the $1^{st}$ sum by the average of the inverted coefficient magnitudes (block 2335). The noise estimator applies a filter (e.g., the example IIR filter 2195 of FIG. 21) to the result of the division (block 2340), sends the noise estimate to a weight calculator (e.g., one or both of the example weight calculators 745, 750), and clears both sums. Control then returns from the example machine accessible instructions of FIG. 23 to, for example, block 2230 of the example machine accessible instructions of FIG. 22.

Figure 24:
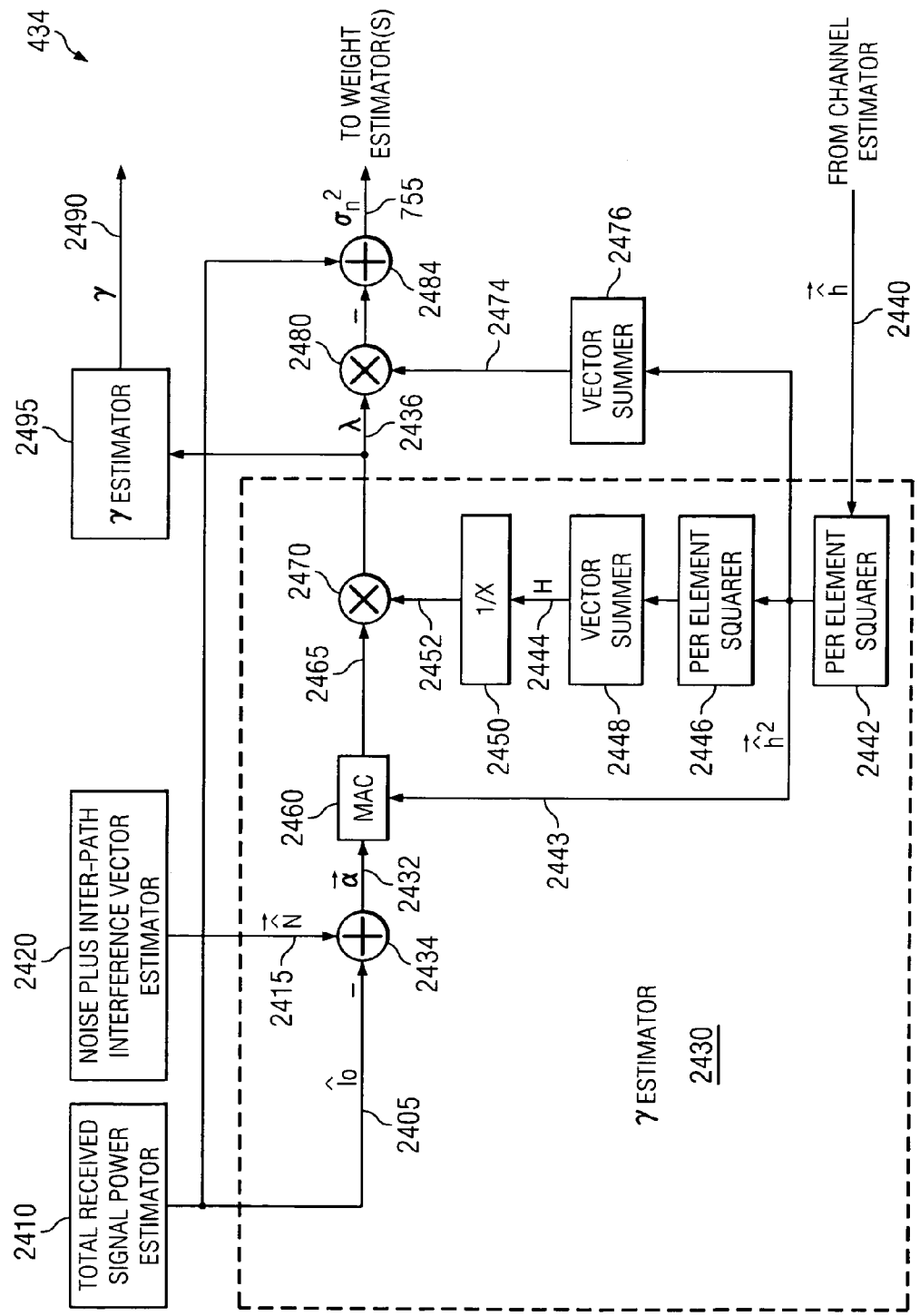
FIG. 24 illustrates an example manner of implementing the example noise estimator of FIG. 4.

FIG. 24 illustrates another example manner of implementing the example noise estimator 434 of FIG. 4. The example noise estimator 434 of FIG. 24 utilizes a least-squares method to estimate the variance of the additive noise given (a) estimates of the multipath channel responses, (b) an estimate of the total received power, and (c) an estimate of the additive noise plus inter-path interference power. The example noise estimator 434 of FIG. 24 can, additionally or alternatively, be used to estimate the pilot-to-total-power ratio γ, and/or the product of the pilot power ratio and the noise power that are used in some wireless receivers.

Letting $\hat{I}o$ represent the estimated total power, the estimated noise plus inter-path interference power for the $j^{th}$ multipath $\hat{N}_j$ can be expressed as $$\hat{N}_j = \hat{I}o - \lambda \hat{h}_j^2 \text{ for } j=1,2,\ldots K, \qquad \text{EQN(11)}$$

where λ represents an unknown inverse of the pilot-to-total transmitted power ratio γ, $\hat{h}_j^2$ is the magnitude of the estimated channel response for the $j^{th}$ multipath, and K is the number of multipaths. Using vector notation, the mathematical expression of EQN (11) can be rewritten as $$\vec{N} = \vec{I}o - \lambda\vec{h}^2. \quad \text{EQN (12)}$$

The least-squares estimate for λ of EQN (11) can be obtained from EQN (12) and is expressed mathematically as $$\tilde{\lambda} = -\left[(\vec{h}^2)'(\vec{h}^2)\right]^{-1}(\vec{h}^2)'\vec{\alpha}, \quad \text{EQN (12)}$$

where $$\vec{\alpha} = \vec{N} - \vec{I}o, \quad \text{EQN (13)}$$

and ( )' represents the transpose operator. Because $$\vec{h}^2$$

is a column vector, the inverse operation illustrated in EQN (12) can be realized as division and, thus, $$\left[(\vec{h}^2)'(\vec{h}^2)\right]^{-1} = \frac{1}{(\hat{h}_1^2)^2 + (\hat{h}_2^2)^2 + \ldots + (\hat{h}_K^2)^2} = \frac{1}{H}. \quad \text{EQN (14)}$$

Substituting EQN (14) into EQN (12), the least-squares solution for λ can be rewritten as $$\tilde{\lambda} = -1 * \frac{(\vec{h}^2)'\vec{\alpha}}{(\vec{h}_1^2)^2 + (\vec{h}_2^2)^2 + \ldots + (\vec{h}_K^2)^2}. \quad \text{EQN (15)}$$

Using the example least-squares estimate for λ of EQN (15) and the mathematical expression of EQN (12), an estimate of the noise variance $\sigma_n^2$ 755 can be computed using the following example mathematical expression $$\sigma_n^2 = \hat{I}o - \lambda \sum_{j=1}^{K} \hat{h}_j^2. \quad \text{EQN (16)}$$

While the example mathematical expressions of EQN (15) and EQN (16) estimate the noise variance $\sigma_n^2$ 755 for a single transmit and a single receive antenna, persons of ordinary skill in the art will readily appreciate that the methods described above can be utilized for any combination of any number of transmit and/or any number of receive antennas. Consider for example, a configuration that includes two-transmit antennas t0 and t1 and two-receive antennas r0 and r1. The example mathematical expression of EQN (15) can be rewritten as $$\tilde{\lambda} = -1 * \frac{(\vec{h}_{t0,r0}^2)'\vec{\alpha}_{t0,r0} + (\vec{h}_{t0,r1}^2)'\vec{\alpha}_{t0,r1} + (\vec{h}_{t1,r0}^2)'\vec{\alpha}_{t1,r0} + (\vec{h}_{t1,r1}^2)'\vec{\alpha}_{t1,r1}}{H_{t0,r0} + H_{t0,r1} + H_{t1,r0} + H_{t1,r1}}, \quad \text{EQN (17)}$$

where $$\vec{h}_{tn,rn}$$

represents the multipath channel response for a transmit-receive antenna pair (tn,rn), $\vec{\alpha}_{tn,rn}$ is calculated for each transmit-receive antenna pair using EQN (13), and $H_{tn,rn}$ is calculated for each of the transmit-receive antenna pairs using EQN (14). The estimated noise variance $\sigma_n^2$ 755 for a particular receive antenna rn can thus be expressed as $$\sigma_{n,rn}^2 = \hat{I}o_{rn} - \lambda\sum_{j=1}^{K}\hat{h}_{t0,rn,j}^2 - \lambda\sum_{j=1}^{K}\hat{h}_{t1,rn,j}^2, \quad \text{EQN (18)}$$

where $\hat{I}o_{rn}$ is the total noise plus inter-path interference measure for receive antenna rn. By adding and/or removing terms from the mathematical expressions of EQN (17) and EQN (18) a noise variance $\sigma_n^2$ 755 for any combination of any number of transmit and/or receive antennas can be determined.

For ease of explanation, the example noise estimator 434 of FIG. 24 is for a single transmit and receive antenna. However, the methods and apparatus illustrated in FIG. 24 can be applied to other combinations and/or numbers of transmit and/or receive antennas. To measure and/or estimate the total received signal power Îo 2405, the example noise estimator 434 of FIG. 24 includes any of a variety of total received signal power estimators 2410. Using any of a variety of method(s), signal(s), technique(s), logic, circuit(s) and/or algorithm(s), the example estimator 2410 of FIG. 24 estimates the total received signal power Îo 2405.

To measure and/or estimate the noise plus inter-path interference $\hat{N}_j$ for each multipath, the example noise estimator 434 of FIG. 24 includes any of a variety of noise plus inter-path interference estimators 2420. Using any of a variety of method(s), signal(s), technique(s), logic, circuit(s) and/or algorithm(s), the example estimator 2420 of FIG. 24 estimates a vector of noise plus inter-path interference values $$\vec{\hat{N}}$$

2415 with each element of the vector 2415 representing the noise plus inter-path interference for a respective multipath.

To estimate the parameter λ 2436 (i.e., the inverse of the pilot-to-total transmitted power ratio γ), the example noise estimator 434 of FIG. 24 includes a λ estimator 2430. The example λ estimator 2430 of FIG. 24 carries out, for example, the mathematical expression of EQN (15) or the mathematical expression of EQN (17).

To compute a difference $\bar{\alpha}$ 2432 of the total received signal power $\hat{I}o$ 2405 and the noise plus inter-path interference vector $$\vec{\tilde{N}}$$

2415, the example $\lambda$ estimator 2430 of FIG. 24 includes any of a variety of adders 2434. The example adder 2434 of FIG. 24 subtracts the total received signal power $\hat{I}o$ 2405 from each element of the noise plus inter-path interference vector $$\vec{\tilde{N}}$$

2415 by reversing the sign of the total received signal power $\hat{I}o$ 2405.

To compute the square of each element of the vector $$\vec{h}$$

of channel estimates 2440, the example $\lambda$ estimator 2430 of FIG. 24 includes any of a variety of per element squarers 2442. The example squarer 2442 of FIG. 24 computes magnitudes 2443 of each of the complex-valued channel estimates in the vector $$\vec{h}$$

2440.

To compute H 2444 (e.g., the denominator of EQN (15)), the example noise estimator 434 of FIG. 24 includes any of a variety of per element squarers 2446, and any of a variety of vector summers 2448. The example per element squarer 2446 of FIG. 24 computes the square of each of the magnitudes $$\vec{h}^2$$

2443. The example vector summer 2448 of FIG. 24 adds together each of the squared magnitudes to obtain H 2444.

To compute the inverse 2452 of H 2444, the example noise estimator 434 of FIG. 24 includes any of a variety of inverters 2450. The example inverter 2450 of FIG. 24 computes the inverse 2452 of the sum of squared magnitudes H 2444.

To compute the numerator of EQN (15), the example $\lambda$ estimator 2430 of FIG. 24 includes any of a variety of multiplier and accumulators (MACs) 2460. The example MAC 2460 of FIG. 24 computes a dot product 2465 of $\bar{\alpha}$ 2432 and the magnitudes $$\vec{h}^2$$

2443. In particular, the multiplier 2460 multiplies corresponding elements of the vectors $\bar{\alpha}$ 2432 and $\vec{h}^2$ 2443 and computes a sum 2465 of those products.

To compute $\lambda$ 2436, the $\lambda$ estimator 2430 of FIG. 24 includes any of a variety of multipliers 2470. The example multiplier 2470 of FIG. 24 multiplies the dot product 2465 and the inverse 2452 of H 2444.

To compute the sum 2474 of the magnitudes of the channel responses $$\vec{h}^2$$

2443, the example noise estimator 434 of FIG. 24 includes any of a variety of vector summers 2476. The example vector summer 2476 adds together each of the elements of the magnitudes $$\vec{h}^2$$

2443.

To compute the noise variance $\sigma_n^2$ 755, the example noise estimator 434 of FIG. 24 includes any of a variety of multipliers 2480 and any of a variety of adders 2484. The example multiplier 2480 of FIG. 24 computes the second ($2^{nd}$) term of EQN (16) and/or EQN (18) by multiplying the estimated $\lambda$ 2436 and the sum 2474 of the magnitudes $$\vec{h}^2$$

2443. The example adder 2484 of FIG. 24 subtracts the output of the multiplier 2480 (i.e., the $2^{nd}$ term) from the total received signal power $\hat{I}o$ 2405 to obtain the estimated noise variance $\sigma_n^2$ 755.

To estimate the pilot-to-the-total transmitted power ratio $\gamma$ 2490, the example noise estimator 434 of FIG. 24 includes a $\gamma$ estimator 2495. The example $\gamma$ estimator 2495 of FIG. 24 computes $\gamma$ 2490 by computing the inverse of $\lambda$ 2436.

While an example manner of implementing the example noise estimator 434 is illustrated in FIG. 24, the noise estimator 434 may be implemented using any of a variety of other and/or additional processor(s), device(s), component(s), circuit(s), module(s), interface(s), etc. Further, the processor(s), device(s), component(s), circuit(s), module(s), element(s), interface(s), etc. illustrated in FIG. 24 may be combined, re-arranged, eliminated and/or implemented in any of a variety of ways. For example, a single MAC circuit and/or unit could be used to implement the example adder 2434, the example MAC 2460, the example multiplier 2470, the example squarers 2442, 2446, the example vector summers 2448, 2476, the example multiplier 2480 and/or the example adder 2484. Additionally, the example adder 2434, the example MAC 2460, the example multiplier 2470, the example squarers 2442, 2446, the example vector summers 2448, 2476, the example multiplier 2480 and the example adder 2484, the example received signal power estimator 2405, the example noise plus inter-path interference estimator 2420, the $\lambda$ estimator 2430 and/or the noise estimator 434 may be implemented as any combination of firmware, software, logic and/or hardware. Moreover, the noise estimator 434 may include additional processor(s), device(s), component(s), circuit(s), interface(s) and/or module(s) than those illustrated in FIG. 24 and/or may include more than one of any or all of the illustrated processor(s), device(s), component(s), circuit(s), interface(s) and/or module(s).

Figure 25:
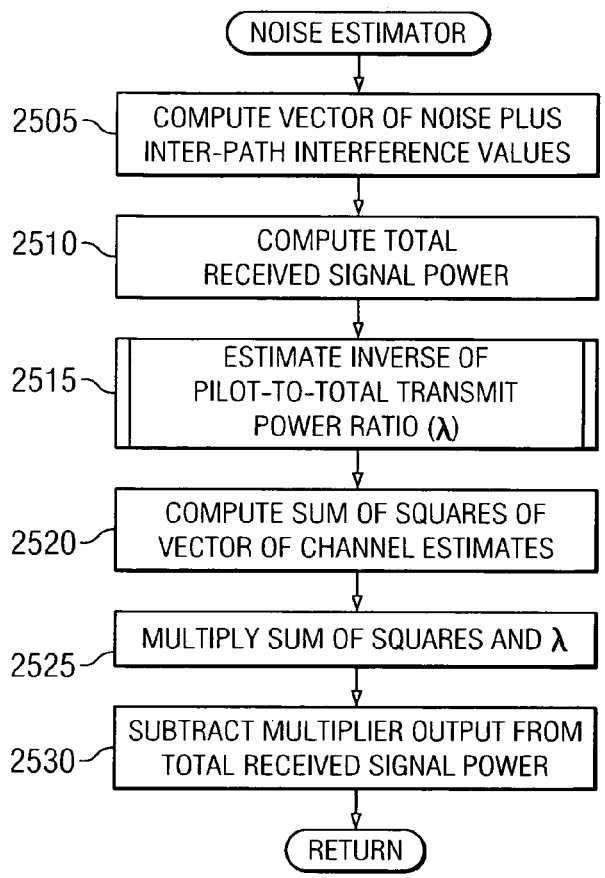
FIGS. 25 and 26 are flowcharts representative of example machine readable instructions which may be executed to implement the example noise estimator of FIG. 24.
Figure 26:
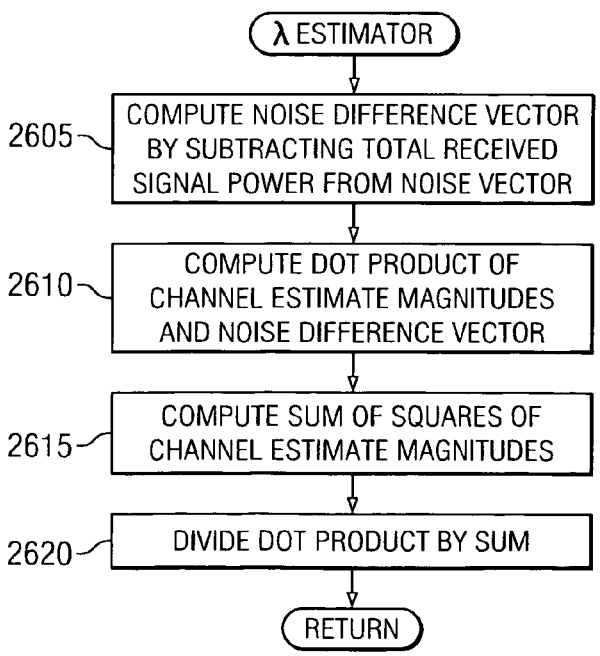

FIGS. 25 and 26 are flowcharts representative of example machine accessible instructions that may be executed to implement the example noise estimator 434 of FIG. 24. The example machine accessible instructions of FIGS. 25 and/or 26 may be executed by a processor, a controller and/or any other suitable processing device. For example, the example machine accessible instructions of FIGS. 25 and/or 26 may be embodied in coded instructions stored on a tangible medium such as a flash memory, ROM and/or RAM associated with a processor (e.g., the example processor 2710 discussed below in connection with FIG. 27). Alternatively, some or all of the example flowcharts of FIGS. 25 and/or 26 may be implemented using any of a variety of ASIC(s), PLD(s), FPLD(s), discrete logic, hardware, firmware, etc. Also, some or all of the example flowcharts of FIGS. 25 and/or 26 may be implemented manually or as any combination(s) of any of the foregoing technique(s), for example, any combination of firmware, software, discrete logic and/or hardware. Further, although the example machine accessible instructions of FIGS. 25 and/or 26 are described with reference to the flowcharts of FIGS. 25 and/or 26 persons of ordinary skill in the art will readily appreciate that many other methods of implementing the example noise estimator 434 of FIG. 24 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 25 and/or 26 may be carried out sequentially and/or carried out in parallel by, for example, separate processing threads, processors, devices, discrete logic, circuits, etc.

The example machine accessible instructions of FIG. 25 begin with noise plus inter-path interference estimator (e.g., the example noise plus inter-path interference estimator 2420 of FIG. 24) estimating a vector of noise plus inter-path interference values (e.g., the example values $$\vec{N}$$

2415) (block 2505). A total received signal power estimator (e.g., the example total received signal power estimator 2410 of FIG. 24) estimates and/or computes the total received signal power (e.g., the example total received signal power $\hat{I}o$ 2405) (block 2510).

A noise estimator (e.g., the example noise estimator 434 of FIG. 24) estimates the parameter $\lambda$ (e.g., the example $\lambda$ 2436 of FIG. 24) by, for example, carrying out the example machine accessible instructions of FIG. 26 (block 2515).

The noise estimator computes a sum of the squares of a vector of channel estimate (e.g., the example channel estimates $\hat{h}$ 2440 of FIG. 24) (block 2520). The noise estimator next computes the product of $\lambda$ and the sum of squares computed at block 2520 (block 2525). The noise estimator then subtracts the product computed at block 2525 from the total received signal power (block 2530). Control then exits from the example machine accessible instructions of FIG. 25.

The example machine accessible instructions of FIG. 26 begin with a $\lambda$ estimator (e.g., the example $\lambda$ estimator 2430 of FIG. 24) subtracting a total received signal power (e.g., the example total received signal power $\hat{I}o$ 2405) from each element of a vector of noise plus inter-path interference values (e.g., the example values $$\vec{h}$$

2415) to form a noise difference vector (block 2605).

The $\lambda$ estimator computes a dot product of the noise difference vector and a vector containing squares of channel estimates (e.g., the example channel estimates $$\vec{N}$$

2440 of FIG. 24) (block 2610). The $\lambda$ estimator computes a sum of the squared channel estimate magnitudes (block 2615). The $\lambda$ estimator multiplies an inverse of the sum computed at block 2615 and the dot product computed at block 2610 (block 2620). Control then returns from the example machine accessible instructions of FIG. 26 to, for example, block 2515 of the example machine accessible instructions of FIG. 25.

VI. Example Processor Platform

Figure 27:
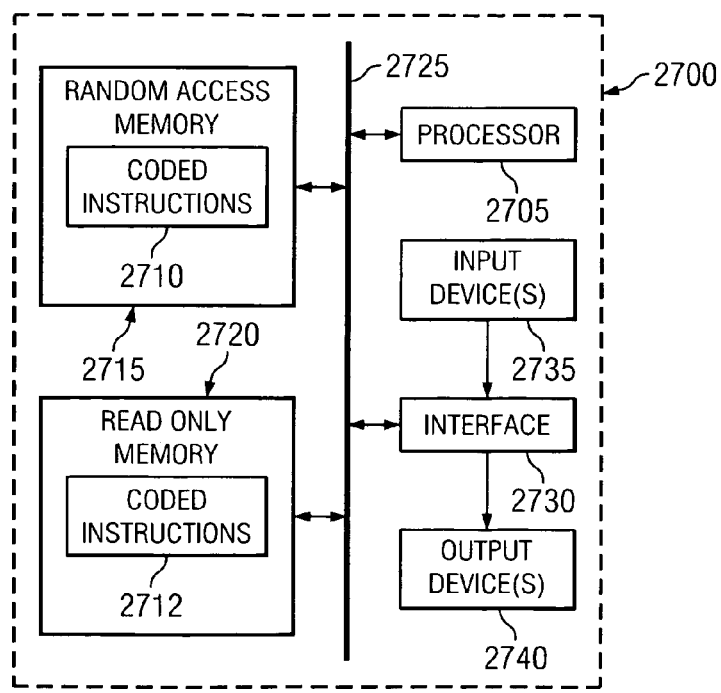
FIG. 27 is a schematic illustration of an example processor platform that may be used and/or programmed to execute the example machine readable instructions represented by FIGS. 11-15, 17, 19, 22, 23, 25 and/or 26 to implement the example equalizer and despreader of FIGS. 3 and/or 4.

FIG. 27 is a schematic diagram of an example processor platform 2700 that may be used and/or programmed to implement the example equalizer and despreader 335, the example weight estimators 414, 416, the example noise estimator 434, the example FDE 440, and/or the example MIMO core 454 disclosed herein. For example, the processor platform 2700 can be implemented by one or more general purpose processors, cores, microcontrollers, etc.

The processor platform 2700 of the example of FIG. 27 includes at least one general purpose programmable processor 2705. The processor 2705 executes coded instructions 2710 and/or 2712 present in main memory of the processor 2705 (e.g., within a RAM 2715 and/or a ROM 2720). The processor 2705 may be any type of processing unit, such as a processor core, processor and/or microcontroller. The processor 2705 may execute, among other things, the example machine accessible instructions of FIGS. 11-15, 17, 19, 22, 23, 25 and/or 26 to implement a wireless receiver. The processor 2705 is in communication with the main memory (including a ROM 2720 and the RAM 2715) via a bus 2725. The RAM 2715 may be implemented by DRAM, SDRAM, and/or any other type of RAM device, and ROM may be implemented by flash memory and/or any other desired type of memory device. Access to the memory 2715 and 2720 maybe controlled by a memory controller (not shown). The RAM 2715 may be used to implement, for example, the example buffers 446, 448, 462 and/or 463 of FIG. 4.

The processor platform 2700 also includes an interface circuit 2730. The interface circuit 2730 may be implemented by any type of interface standard, such as an external memory interface, serial port, general purpose input/output, etc. One or more input devices 2735 and one or more output devices 2740 are connected to the interface circuit 2730. The input devices 2735 and/or output devices 2740 may be used to, for example, receive the input samples 401, 402.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A process of frequency-domain equalization in high-speed downlink packet access receivers for wireless channels with large delay-spreads, comprising:
   A. receiving wireless signals having at least a first and a second set of multipath signals with large delay spreads;
   B. computing a first set of channel estimates and equalizer weights for the first set of the multipath signals, the computing including computing at least a partial Fourier transform of frequency domain channel estimates that correspond to frequencies at which equalization will be performed;
   C. computing a second set of channel estimates and equalizer weights for the second set of the multipath signals, the computing including computing at least a partial Fourier transform of frequency domain channel estimates that correspond to frequencies at which equalization will be performed;
   D. transforming the received wireless signals to frequency domain representations of the received wireless signals with Fourier transforms;
   E. equalizing the frequency domain representations with the first set of channel estimates and equalizer weights to form first equalized signals;
   F. equalizing the frequency domain signal representations with the second set of channel estimates and equalizer weights to form second equalized signals;
   G. inverse Fourier transforming to the time domain the first and second equalized signals; and
   H. combining the first and the second time domain transformed equalized signals by delaying the first time domain transformed equalized signal by an amount equal to a nearest integer that is less than a difference between a first delay associated with the first set of multipaths and a second delay associated with the second set of multipaths divided by a length of a code sequence used to despread the combined equalized signals.

2. The process of claim 1 in which the delaying includes delaying with a buffer and the amount of delay required is D chips.

3. The process of claim 1 including providing the combined first and second time domain transformed equalized signals to a demodulator.

* * * * *